United States Patent
Brunner

(10) Patent No.: US 10,366,470 B2
(45) Date of Patent: Jul. 30, 2019

(54) OBJECT SEPARATION FOR SCANNED ASSETS

(71) Applicant: YouSpace, Inc., Santa Clara, CA (US)

(72) Inventor: Ralph Brunner, Los Gatos, CA (US)

(73) Assignee: YouSpace, Inc., Santa Clara, CA (US)

( * ) Notice: Subject to any disclaimer, the term of this patent is extended or adjusted under 35 U.S.C. 154(b) by 0 days.

(21) Appl. No.: 15/838,228

(22) Filed: Dec. 11, 2017

(65) Prior Publication Data

US 2019/0180410 A1 Jun. 13, 2019

(51) Int. Cl.
| | | |
|---|---|---|
| G06T 3/00 | (2006.01) |
| G06N 7/00 | (2006.01) |
| G06T 7/90 | (2017.01) |
| G06T 11/60 | (2006.01) |
| G06T 13/20 | (2011.01) |
| G06T 11/00 | (2006.01) |
| G06Q 30/06 | (2012.01) |

(52) U.S. Cl.
CPC .......... *G06T 3/0056* (2013.01); *G06N 7/005* (2013.01); *G06T 7/90* (2017.01); *G06T 11/001* (2013.01); *G06T 11/60* (2013.01); *G06T 13/20* (2013.01); *G06Q 30/0643* (2013.01)

(58) Field of Classification Search
CPC ................................ G06T 3/0056; G06T 9/00
See application file for complete search history.

(56) References Cited

U.S. PATENT DOCUMENTS

| | | | |
|---|---|---|---|
| 7,948,481 B2 | 5/2011 | Vilcovsky | |
| D727,995 S | 4/2015 | Vilcovsky | |
| D753,754 S | 4/2016 | Vilcovsky | |
| 2008/0151092 A1 | 6/2008 | Vilcovsky | |
| 2011/0199294 A1 | 8/2011 | Vilcovsky | |
| 2013/0215116 A1* | 8/2013 | Siddique ............ | G06Q 30/0643 345/420 |
| 2014/0225977 A1 | 8/2014 | Vilcovsky et al. | |
| 2014/0226000 A1 | 8/2014 | Vilcovsky et al. | |

OTHER PUBLICATIONS

U.S. Appl. No. 15/018,048, filed Feb. 8, 2016.
U.S. Appl. No. 15/018,303, filed Feb. 8, 2016.
U.S. Appl. No. 15/369,799, filed Dec. 5, 2016.
U.S. Appl. No. 15/486,218, filed Apr. 12, 2017.
U.S. Appl. No. 15/478,209, filed Apr. 3, 2017.
PCT/US2017/027371, filed Apr. 13, 2017.

(Continued)

*Primary Examiner* — Marc Anthony Armand

(57) ABSTRACT

Various of the disclosed embodiments present systems and methods for distinguishing portions of a virtual model associated with a clothing article from portions of the virtual model not associated with the clothing article. Some embodiments facilitate quick and effective separation by employing a feature vector structure conducive to separation by a linear classifier. Such efficient separation may be especially beneficial in applications requiring the rapid scanning of large quantities of clothing while retaining high-fidelity representations of the clothing's geometry. Some embodiments further accommodate artist participation in the filtering process as well as scanning of articles from a variety of orientations and with a variety of supporting structures.

20 Claims, 18 Drawing Sheets

(56) References Cited

OTHER PUBLICATIONS

U.S. Appl. No. 15/478,201, filed Apr. 3, 2017.
PCT/US2017/027449, filed Apr. 13, 2017.
Chih-Chung Chang, et al., LIBSVM: A Library for Support Vector Machines. 2011. Available at http://www.csie.ntu.edu.tw/~cjlin/papers/libsvm.pdf. (Retrieved Feb. 8, 2017).
Ádám Horváth, Fitnect—CIB, Published Nov. 25, 2015. Available at https://www.youtube.com/watch?v=k06gvSzrsdw. (Retrieved Sep. 10, 2017).
FXGear, FXMirror_3D Virtual Fitting Solution, Published Feb. 3, 2015. Available at https://www.youtube.com/watch?v=nWcGhuX6N7w. (Retrieved Sep. 10, 2017).
ArdoorMoscow, Kinect Fitting Room for Topshop, Published May 10, 2011. Available at https://www.youtube.com/watch?v=L_cYKFdP1_0. (Retrieved Sep. 10, 2017).
IMGSRCinc, Puma Store Harajuku Interactive Mirror®, Published Mar. 3, 2011. Available at https://www.youtube.com/watch?v=_X2-_t5f_IA. (Retrieved Sep. 10, 2017).
SenseMi—Sense Mirror, SenseMi Virtual Dressing Room, Published May 4, 2017. Available at https://www.youtube.com/watch?v=0Nh6eEjBal8. (Retrieved Sep. 10, 2017).
Unreal Engine 4—Augmented Reality Virtual Mirror Test, Published Mar. 17, 2016. Available https://www.youtube.com/watch?v=zT_emXRZ5iA&feature=youtu.be. Retrieved (Oct. 1, 2017).
Unreal4mirror website, available at http://unreal4mirror.com/. Retrieved (Sep. 10, 2017).
Body Labs, BBC Click report on Body Labs, Published Mar. 17, 2015. Available at https://www.youtube.com/watch?v=UbYCzxXXR1Q. (Retrieved Sep. 6, 2017).
MemoMi Labs Inc, Live with Channel 9 Australia—Vimeo, Published May 28, 2015. Available at https://vimeo.com/129075274. (Retrieved Sep. 4, 2017).
MemoMi Labs Inc, MemoMi @ CNBC Jun. 2015—Vimeo, Published Jun. 11, 2015. Available at https://vimeo.com/130502071. (Retrieved Sep. 4, 2017).
MemoMi Labs Inc, MemoMi Eyewear on Channel 10 Australia—Vimeo, Published Jul. 24, 2016. Available at https://vimeo.com/176075233. (Retrieved Sep. 4, 2017).
MemoMi Labs Inc, MemoMi @ Intel CEO Keynote—Vimeo, Published Aug. 19, 2015. Available at https://vimeo.com/136731687. (Retrieved Sep. 4, 2017).
MemoMi Labs Inc, MemoMi NRF 2014 @ Intel Channel—Vimeo, Published Feb. 3, 2014. Available at https://vimeo.com/85788520. (Retrieved Sep. 4, 2017).
David Rose, MemoMi—Vimeo, Published Sep. 23, 2012. Available at https://vimeo.com/50027314. (Retrieved Sep. 4, 2017).
MemoMi Labs Inc, MemoMi @ WSJ—Vimeo, Published May 11, 2015. Available at https://vimeo.com/127500728. (Retrieved Sep. 4, 2017).
MemoMi Labs Inc, Memory Makeover™ Mirror—Vimeo, Published Dec. 6, 2016. Available at https://vimeo.com/194615701. (Retrieved Sep. 4, 2017).
MemoMi Labs Inc, Sunglass Memory Mirror®—Vimeo, Published Jul. 28, 2016. Available at https://vimeo.com/176675288. (Retrieved Sep. 4, 2017).
MemoMi Labs Inc, Transparent Mirror—MemoMi × Corning—Vimeo, Published Apr. 7, 2016. Available at https://vimeo.com/161959806. (Retrieved Sep. 4, 2017).
MemoMi Labs Inc, Turning colors . . . —Vimeo, Published Jan. 5, 2015. Available at https://vimeo.com/115948779. (Retrieved Sep. 4, 2017).
MemoMi Labs Inc, Inventions—Vimeo, Published Nov. 8, 2016. Available at https://vimeo.com/190673032. (Retrieved Sep. 4, 2017).

\* cited by examiner

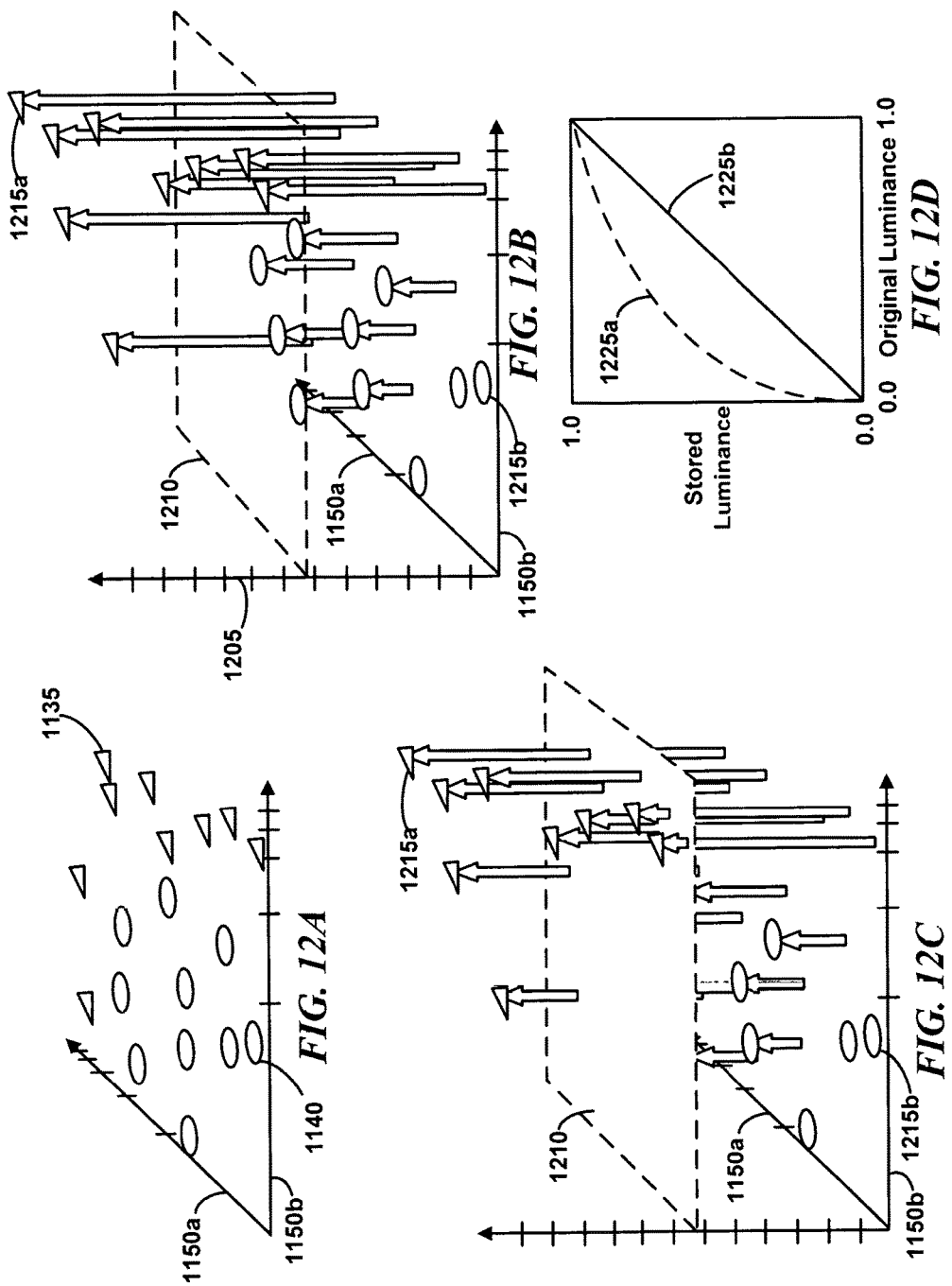

```
1  Function maskMesh(Array vertices, Array faces, Map texture_map)
2  {
3      for each vertex in vertices
4      {
5          if(classification_for_color(texture_map[vertex]) == "NON_ITEM")
6              vertex.x = 0; vertex.y = 0; vertex.z = 0;
7      }
8
9      Array faces_to_keep = [];
10     Array vertices_to_keep = [];
11     Array texture_map_to_keep = [];
12
13     for each face in faces
14     {
15         if(!is_origin(face.vertex[0]) AND !is_origin(face.vertex[1]) AND !is_origin(face.vertex[2]))
16         {
17             faces_to_keep.push(face);
18             vertices_to_keep.push(face.vertex[0]);
19             vertices_to_keep.push(face.vertex[1]);
20             vertices_to_keep.push(face.vertex[2]);
21             texture_map_to_keep.push(face.vertex[0], texture_map[face.vertex[0]]);
22             texture_map_to_keep.push(face.vertex[1], texture_map[face.vertex[1]]);
23             texture_map_to_keep.push(face.vertex[2], texture_map[face.vertex[2]]);
24         }
25     }
26
27     return Array(faces_to_keep, vertices_to_keep, texture_map_to_keep);
28 }
```

*FIG. 14*

OBJECT SEPARATION FOR SCANNED ASSETS

TECHNICAL FIELD

Various of the disclosed embodiments relate to color-differentiated recognition and the refinement of virtual models depicting real-world objects.

BACKGROUND

Users increasingly desire to integrate their virtual and real-world experiences. Such integration often demands responsive user interfaces as well as high-fidelity virtual representations of real-world objects. Various machine vision technologies may be used to address both of these demands. For example, gesture-based interfaces may be implemented using depth and/or visual-imaging sensor systems (e.g., the Microsoft Kinect™, Intel RealSense™, Apple PrimeSense™, Structure Sensor™, Velodyne HDL-32E LiDAR™, Orbbec Astra™, etc.). Similarly, a variety of tools and techniques may be used to generate virtual representations of real-world objects (using various scanning devices, e.g., the Artec Eva™, Artec Shapify Booth™, Twindom Twinstant™ full body 3D scanner, etc.).

Unfortunately, the mass production of high-fidelity virtual representations of real-world objects can be difficult and expensive. Particularly, scans of real-world objects very often include undesirable artifacts originating either from neighboring objects or scanning errors. While such artifacts may be manually corrected, such correction quickly becomes unfeasible when scanning large numbers of real-world objects. Automated systems may also fail to adequately isolate the real-world object of interest from surrounding objects during the scanning process. In addition, automated systems may fail to anticipate subsequent manual corrections by artists. When virtual models include undesirable artifacts, or omit features of the real-world object, the subsequent virtual rendering may be unconvincing or otherwise suboptimal.

Consequently, when scanning a large number of real-world objects, there is a need to reduce the dependency upon manual correction so as to reduce the cost, time, and expense of the scanning process. Reliance upon manual correction mitigates the effective scanning of real-world objects in large numbers, as well as limits the number of viable high-volume scanning applications. The average user, for example, will often neither have the skills, nor the inclination, to hire an artist to make corrections. Neither will users typically wish to perform the tedious correction process themselves. However, a successful automated system may also need to anticipate subsequent manual intervention.

These limitations mitigate the seamless integration of the real and virtual worlds. Consequently, there exists a need for systems and methods to more adequately automate the creation and use of high-fidelity real-world objects in virtual environments.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 12A is a schematic three-dimensional view of the color feature vectors of FIG. 11C; FIG. 12B is a schematic three-dimensional view of FIG. 12A's feature vectors following introduction of an additional linear dimension, as well as a linear separating hyperplane facilitated by the additional dimension; FIG. 12C is a schematic view of FIG. 12B where the hyperplane is filled to facilitate understanding; and FIG. 12D is a schematic two-dimensional plot comparing gamma corrected and more linearized color dimensions;

FIG. 14 is a pseudo-code listing depicting one possible implementation of the process of FIG. 13;

Figure 1A:
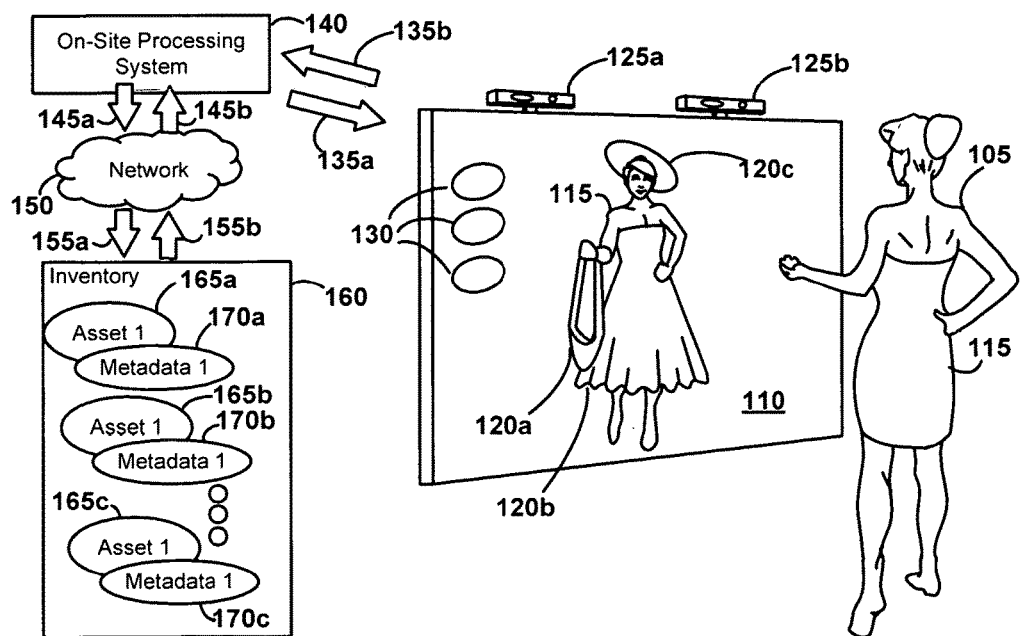
FIG. 1A is a schematic use-case diagram illustrating an example clothes shopping application facilitated in part by various of the disclosed embodiments.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The embodiments are intended to cover all modifications, equivalents, and alternatives falling within the scope of the disclosed examples, rather than limit the embodiments to the particular examples described or depicted.

DETAILED DESCRIPTION

Example Use Case Overview

Figure 1B:
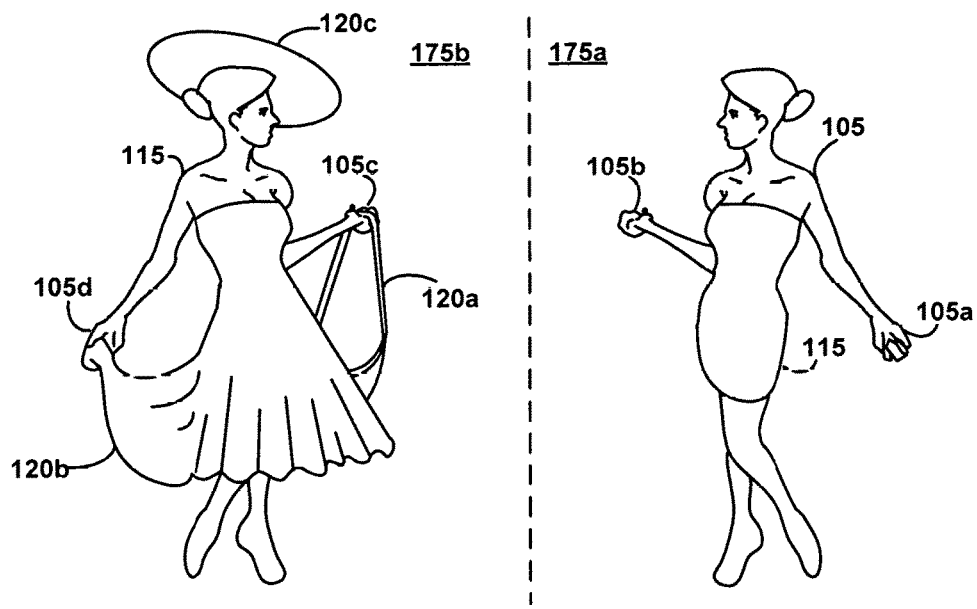
FIG. 1B is a schematic diagram illustrating virtual and real-world objects as they may appear in connection with the schematic use-case diagram of FIG. 1A.

Various of the disclosed embodiments may be used in conjunction with apparel selection and other augmented reality applications. For example, FIG. 1A is a schematic use-case diagram illustrating an example clothes shopping application, which may be facilitated in part by various of the disclosed embodiments. FIG. 1B is a schematic diagram illustrating virtual and real-world objects as may appear in connection with the schematic use-case diagram of FIG. 1A.

A user 105 may approach a display system 110 (e.g., a system as described in U.S. patent application Ser. No. 15/478,209 filed Apr. 3, 2017) in her home, a shopping mall, etc. The display system 110 may include a plurality of sensors 125a, 125b, which may capture depth and visual image data of the user 105. This data may be used to generate a virtual representation 175b of the real-world 175a user 105. In one example application, though the user 105 may wear a real-world article of clothing 115, the virtual representation 175b may depict the user instead wearing virtual representations of clothing articles, e.g., a purse 120a, a dress 120b, and a hat 120c (though one will readily appreciate that any suitable article of clothing, e.g., watches, glasses, leggings, shoes, etc. may be virtually represented). Such a depiction may appear, e.g., on an avatar or upon a real-time rendering of portions of the user 105.

In some applications, the virtual display may simply be used for entertainment and may represent articles at lower fidelities. However, some applications may impose considerable technical demands upon the representation of the virtual clothing articles 120a-c. For example, in a clothing selection application (e.g., in a clothing store changing room), it may be desirable for the user to interact with the virtual articles as part of a high-fidelity physics-based simulation. As the user 105 raises and/or rotates her right hand 105b, the user 105 may expect the purse 120a and its strap in her virtual hand 105c to respond in a convincing manner. Similarly, real-world actions taken with the user's left hand 105a should precipitate similar physical interactions relative to her virtual hand 105d, such as clutching and raising the virtual representation of the dress 120b as shown here. Similarly, rotation by the user 105 of their body, should precipitate corresponding realistic movement in the dress 120b. Such fidelity may better inform the user's ability to evaluate the clothing and make a purchasing decision. Even where the application does not seek such direct physical interaction, high-fidelity virtual models of real-world assets may be desirable to ensure realistic looking behavior.

Such clothing applications may require the high fidelity representation of many clothing articles. For example, a user interface 130 may permit the user 105 to select from a wide variety of inventoried clothing items. Consequently, the display 110 may be in two-way communication 135a, 135b with an on-site processing system 140 and/or an inventory system 160. The display 110 may communicate 135b, e.g., article selections by the user to the system 140 and receive communications 135a, e.g., describing virtual assets to render. One will appreciate that the system 140 may be part of and possibly internal to display 110. In some embodiments, the on-site system 140 may also communicate 145a, 145b, 155a, 155b with the inventory system 160 across a network 150, e.g., the Internet or an in-store network. For example, the on-site system 140 may request 145a, 155a and receive 145b, 155b virtual asset data, as well as purchase orders, user profile data, etc. Thus, the collection of virtual items that, e.g., a store owner may wish to display on the system 110 may include the tens, hundreds, thousands, or more items in the inventory 160.

Each clothing item may be represented as one of virtual assets 165a-c and corresponding metadata 170a-c. For example, virtual asset 165a may include a virtual model of a clothing article, depicting its geometry and texture. Corresponding metadata 170a may include the materials, properties, and corresponding physics-based details (e.g., weight, elasticity, transparency, etc.) of all or a portion of the asset 165a, possibly as well as transaction information, such as numbers available in inventory. For example, the elasticity of a purse strap may appear as metadata via a tensor representation in the metadata 170a. The color, texture, and geometry of the strap may appear in the asset itself 165a. For clarification, "virtual model" as used herein generally refers to the geometric structure, such as a vertex mesh, of a virtual asset. In some embodiments, the geometric structure may be distinct from the physical property metadata of the object.

Inaccurate geometric and texture data may not only result in an inaccurate rendering of the virtual clothing article, but may unnecessarily increase the storage overhead in inventory 160 as well as sabotage the proper operation of the physics-based renderer. If, for example, portions of the table upon which purse was sitting during capture are included in its model, then the virtual representation of the purse 120a may fail to swing realistically or to realistically depict compression of the purse against a surface. Accordingly, clothing applications such as this example demand both that a large number of physical assets be scanned for inclusion in the system as well as that the scans be of sufficient accuracy that they may be rendered faithfully and/or used in the physics-based simulation.

Example Data Capture Overview—Mannequins

Figure 2A:
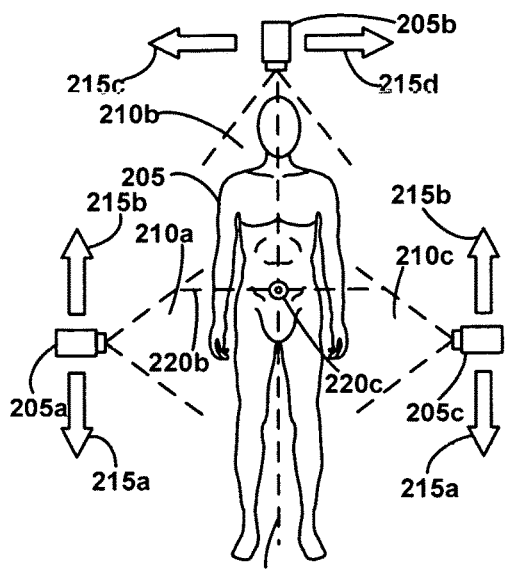
FIG. 2A is a schematic diagram illustrating, from a frontal-view, the orientations that may be assumed by a scanning capture system relative to a mannequin as may occur in some embodiments.
Figure 2B:
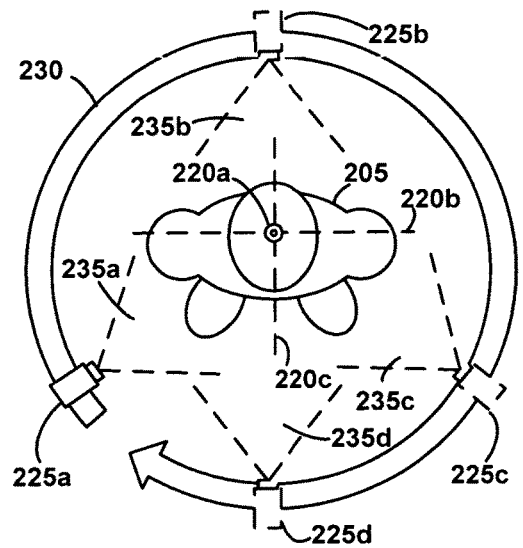
FIG. 2B is a schematic diagram illustrating, from a top-down view, the orientations that the scanning capture system may assume relative to a mannequin as may occur in some embodiments.

To facilitate scanning, real-world clothing assets may be placed on a mannequin in a manner similar to how they will be worn and then scanned with a depth and visual-image based scanner (e.g., the Artec Eva™). FIG. 2A is a schematic diagram illustrating, from a frontal-view, the orientations that may be assumed by a scanning capture system relative to a mannequin 205 as may occur in some embodiments. FIG. 2B is a schematic diagram illustrating, from a top-down view, the orientations that the scanning capture system may assume relative to the mannequin 205 as may occur in some embodiment. Though the mannequin 205 depicted here assumes the form of an adult male, one will appreciate that "mannequin" may refer to any physical object suitable for placing a clothing asset in an orientation amenable to data capture. Consequently, different mannequins may be used for different objects, sometimes corresponding to a variety of genders, body dimensions, and ages. For example, a female torso mannequin may better suffice to capture a tightly-fitting dress than an androgynous or male mannequin.

Like the adult male mannequin 205, however, many mannequins will have a longitudinal axis 220a, lateral axis 220b, and depth axis 220c, as may the three dimensional clothing article. One will appreciate that the axis naming is arbitrary and that axes "X, Y, Z" may suffice as well. The depth capture system used may capture the exterior of a clothing article placed upon the mannequin by rotating around and/or translating along one or more of these axes. For a standing mannequin, full rotation 230 of the scanning system about the longitudinal axis 220a, including, e.g. at each of positions 225a-d and corresponding capture fields of view 235a-d may capture the exterior of many clothing articles. Similar rotations may occur around the lateral axis 220b or depth axis 220c. Similarly, rotation of the scanning system about the depth axis 220c, including, e.g. at each of positions 205a-c and corresponding capture fields of view 210a-c may capture the exterior of many clothing articles. Similar rotations may occur around the lateral axis 220b and one will appreciate that the positions provided here are not exhaustive, nor necessary for all clothing articles, but rather provided merely to facilitate understanding.

Some articles may require analogous capture about an appendage. For example, a necklace may only require capture around the longitudinal axis 220a as it passes through the mannequin's neck. Capture of a bracelet or wristwatch may require capture around an analogous longitudinal axis of the mannequin's wrist. Both the texture and geometry of the exterior may be captured using visual-range and depth-based sensors respectively (though one will appreciate alternative methods, e.g., parallax-based approaches to infer geometry from visual images exclusively). In addition, though "movement" of the scanning system to various positions is used here to facilitate understanding, one will appreciate that many scanning systems instead make use of a plurality of capture systems placed at various positions around the mannequin 205. Consequently, they may not need to "move" to perform a comprehensive data capture.

Translating scanners up 215b and down 215a the longitudinal axis 220a may be used to capture clothing assets in some embodiments. Lateral movements 215c and 215d in the plane of the lateral axis 220b and depth axis 220c may also facilitate capture (e.g., of the top of a hat from position 205b). One will appreciate that the mannequin 205 may be rotated to facilitate capture from different orientations (indeed, it may be the mannequin rather than the depth sensor that moves in some embodiments). Similarly, arms, legs, and other extensions may be configurable to facilitate scanning. For example, the mannequin's 205 arm may be raised to facilitate scanning of a watch from all angles around its wrist. Thus, multiple scanners may be employed simultaneously or one or more scanners moved around the mannequin. One will appreciate that a number of scanning systems may be used to capture the various clothing items, e.g., the Artec Eva™, Artec Shapify Booth™, Twindom Twinstant™ full body 3D scanner, etc.

Figure 2C:
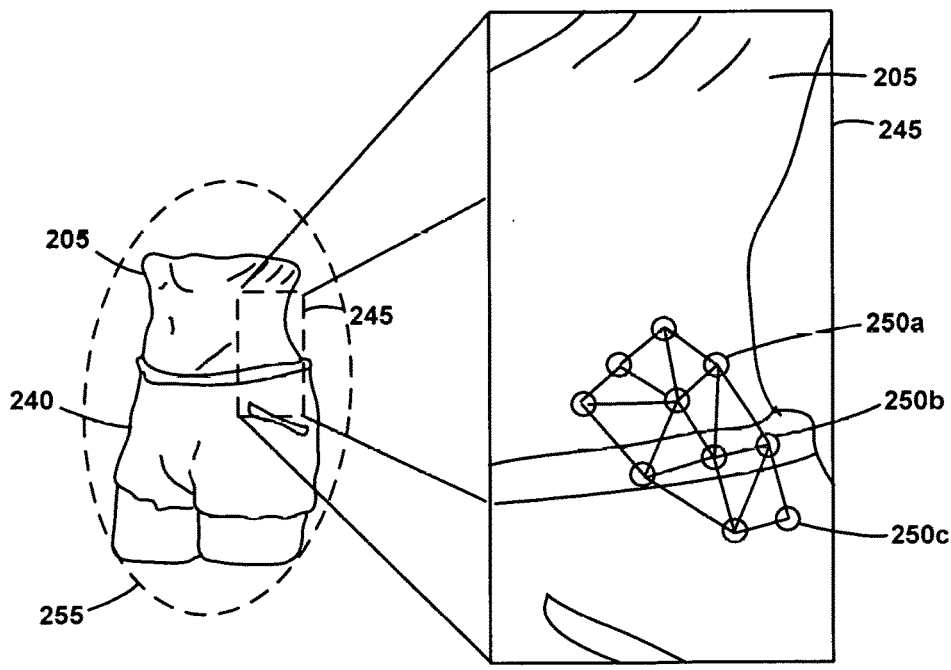
FIG. 2C is a schematic enlarged view of a portion of a virtual model as may be generated in some embodiments.

Regardless of the particular scanning capture system used, one will appreciate that in scanning, particularly in scanning a larger number of items, the system will often capture both clothing data and mannequin data within the scanner's field of view. FIG. 2C is a schematic enlarged view of a portion of a virtual model 255 resulting from scanning, as may be generated in some embodiments. Particularly, after scanning the mannequin 205 and a pair of shorts 240 placed thereon, the resulting virtual model 255 may comprise data points associated with the mannequin 205 and data points associated with the shorts 240.

Consequently, where the virtual model is a vertex mesh, as shown in the enlargement 245, some vertices of the mesh will be associated with the mannequin 205 and some vertices of the mesh will be associated with the shorts 240. For example, vertices 250b and 250c correspond to the shorts and should be retained. In contrast, vertex 250a is part of the mannequin and would ideally be removed. Retaining vertex 250a, particularly many such vertices, may disrupt subsequent renderings and physics-based modelling of the short's 240 virtual model. To facilitate removal of these unwanted vertices, mannequin 205 may be of a different color and/or texture from the asset (e.g., shorts 240). This may be accomplished by using different mannequins for different articles, using mannequins with adjustable colors (e.g., illuminated mannequins), performing capture under different lighting conditions (e.g., illuminating clothed mannequins or fixtures with a black light, where the mannequin surface, fixture, etc., but not the clothing, or vice versa, responds distinctively to the illumination). Some embodiments described herein use the difference in clothing article vs. non-article texture to distinguish the clothing article vertices from non-article vertices. The clothing of interest may be referred to as the "asset" herein, and the non-clothing items to be removed, the "non-asset."

Example Data Capture Overview—Isolated Items

As discussed, mannequins may be moved and adjusted to facilitate thorough data capture of different clothing articles. In addition, or in lieu of, capture of an article as it is worn, it may be beneficial to additionally, or alternatively, capture the article in isolation. Such isolated captures may also facilitate the incorporation of physical features into the asset's metadata (e.g., by imposing a known stress upon the article).

Figure 3:
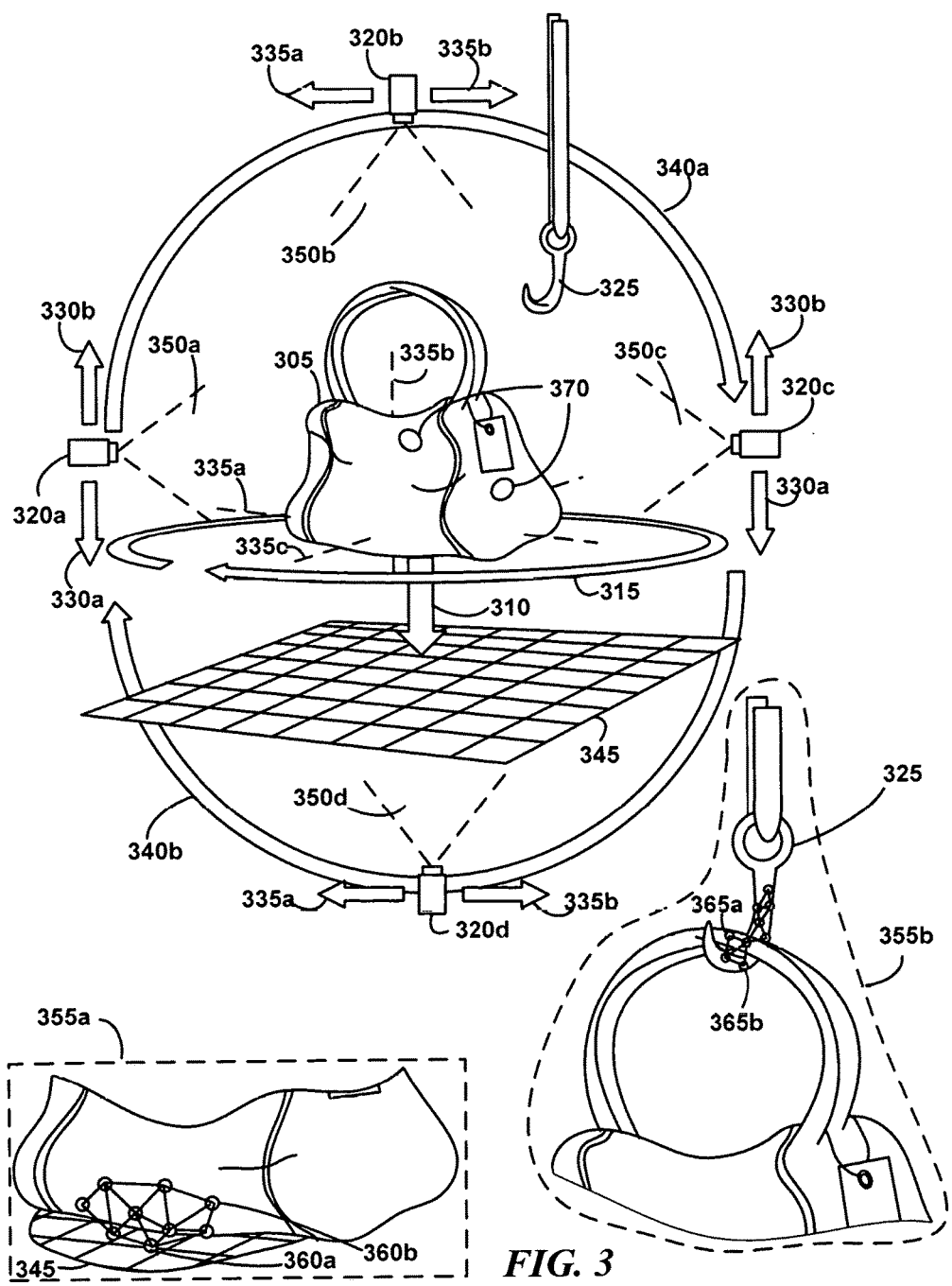
FIG. 3 is a schematic diagram illustrating an example data capture of a bag as may occur in some embodiments.

Accordingly, to better capture the geometry and physical character of some clothing articles, the articles may be suspended, placed upon a platform, exposed to various forces, etc. For example, FIG. 3 is a schematic diagram illustrating an example data capture of a bag 305 as may occur in some embodiments. As with mannequin 205 and the clothing placed upon it (e.g., shorts 240), the bag 305 may likewise be associated with a longitudinal axis 335a, a lateral axis 335b, and depth axis 335c. Texture and depth capture sensors may likewise be moved laterally in directions 330a, 330b and 335a, 335b within a plane from a variety of positions 320a-d and corresponding fields of view 350a-d. By moving a sensor, or placing multiple sensors, on a path 315 around the longitudinal axis 335a and the lateral axis 335b or depth axis 335c (e.g., on paths 340a and 340b) a complete virtual model of the bag's exterior may be created. In this case, additional scans within the handle straps and bag interior may be necessary to fully capture the asset geometry. However, some applications may only seek virtual models of the item's exterior.

To accomplish such orientation versatility during scanning capture, it may be necessary to, e.g., suspend the bag from a fixture 325, place 310 the bag on a surface 345, or otherwise fix the bag so that the sensors' fields of view have access to the bag along one or more of paths 340a, 340b, and 315. The surface 345 may include a color or patterned texture (e.g., a checkerboard texture) to facilitate registration of the article's orientation relative to the scanning device.

As with the enlargement 245, such depth captures may (often undesirably) include portions of the surface 345 and fixture 325. For example, as shown in the enlargement 355a of a virtual model following a scan where the bag 305 sat upon surface 345, several vertices of the virtual model may be associated with the surface 345 rather than the bag 305. Particularly, while the virtual model includes vertex 360b associated with the bag 305, vertex 360a is associated with the surface 345. Similarly, in the example of enlargement 355b, the resultant virtual model when the bag 305 is scanned suspended from fixture 325 includes vertices (e.g., vertex 365a) associated with the bag 305 as well as vertices (e.g., vertex 365b) associated with the fixture 325.

In some embodiments, zippers, tassels, translucent fabrics, and certain materials, may be difficult to scan or result in ambiguous virtual model properties. Consequently, fiducial markers 370 may be placed on the article in some instances prior to scanning. These markers 370 may be relocated between scans and subsequently removed. Their intermediate presence, however, may facilitate post-processing operations to account for the imperfectly scanned portion of the article. For example, they may serve as a "placeholder" to facilitate subsequent manual supplementation, e.g., by an artist.

Example Virtual Model Creation

As described above, to acquire a comprehensive virtual model of an article of clothing, multiple scans may be performed. Some scans may include aspects of the article that were absent in other scans (e.g., the interior of a bag or pair of shorts, in contrast with its exterior). Conversely, some scans may include additional occluding or supporting elements absent in other scans (e.g., the mannequin 205, surface 345, and fixture 325).

Figure 4:
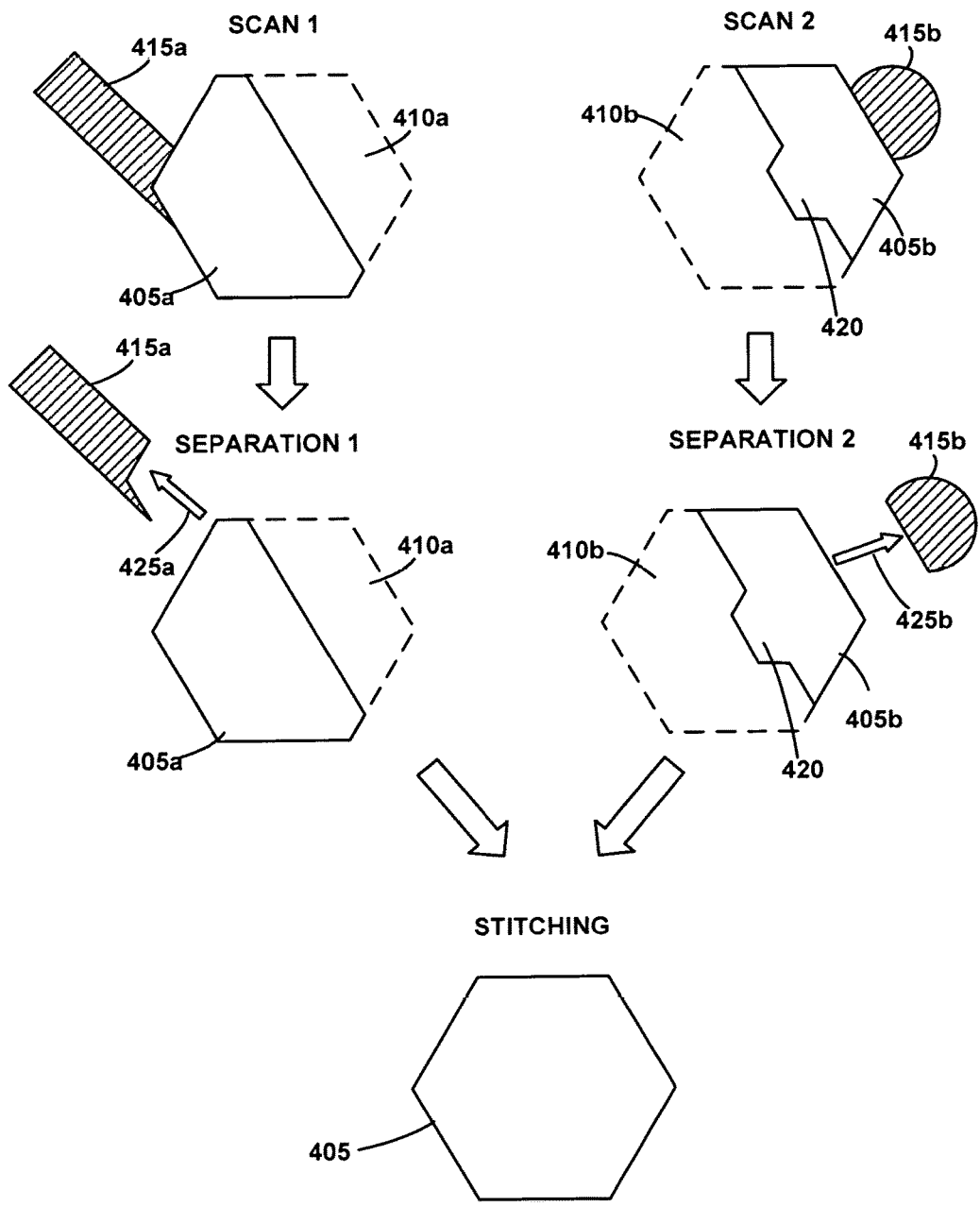
FIG. 4 is a schematic diagram illustrating, at a high level, the use of separation and stitching algorithms to recover an object of interest from several scans, as may occur in some embodiments.

To visualize these variations and their processing, FIG. 4 is a schematic diagram illustrating, at a high level, the use of separation and stitching algorithms to recover an object of interest from several scans, as may occur in some embodiments. In this example, the complete, desired virtual model of the article is represented in the abstract as a hexagon 405. During a first scan SCAN 1, the resulting virtual model may include a portion of the desired article 405a. However, the scan may also omit a portion 410a (e.g., the article's interior, a portion occluded by mannequin 205, surface 345, or fixture 325, etc.) and may include an additional non-article portion 415a (e.g., a portion of mannequin 205, surface 345, or fixture 325, etc.). To account for the omitted portion 410a of the article, a second scan SCAN 2 may be performed. This second scan may also omit a portion 410b of the article and also include an additional non-article portion 415b. Note that scans may include overlapping portions of the article. For example the extension 420 here is used to indicate that part of the article captured in SCAN 2 was also captured in SCAN 1. Additionally, though only two scanning sessions are shown here, one will appreciate that fewer or more sessions may occur, depending upon the nature of the clothing article and the fixtures, mannequins, etc. available.

Following scanning, the non-article portions of the virtual models may be removed. For example, in SEPARATION 1 an automated system and/or user may identify vertices from the portion 415a associated with the non-article and remove 425a them (as well as the corresponding texture information and geometric faces) from the virtual model 405a. Similarly, in SEPARATION 2 an automated system and/or user may identify vertices from the portion 415b associated with the non-article and remove 425b the vertices from the virtual model 405b (again, also removing the corresponding texture information and geometric faces). The user and/or automated system may then perform STITCHING to create a single, consolidated virtual model 405 of the article. During STITCHING overlapping portion 420 may be reconciled with its counterpart in the model 405a.

Though separation is shown here occurring prior to stitching, one will appreciate that in some situations different orderings may occur. In general, however, failure to properly SEPARATE non-article vertices may cause STITCHING to proceed improperly or not at all. Even where STITCHING is not performed or succeeds, poor separation may still result in unexpected and unrealistic behaviors in the subsequently rendered virtual article.

Example Virtual Model Creation Pipeline

Figure 5:
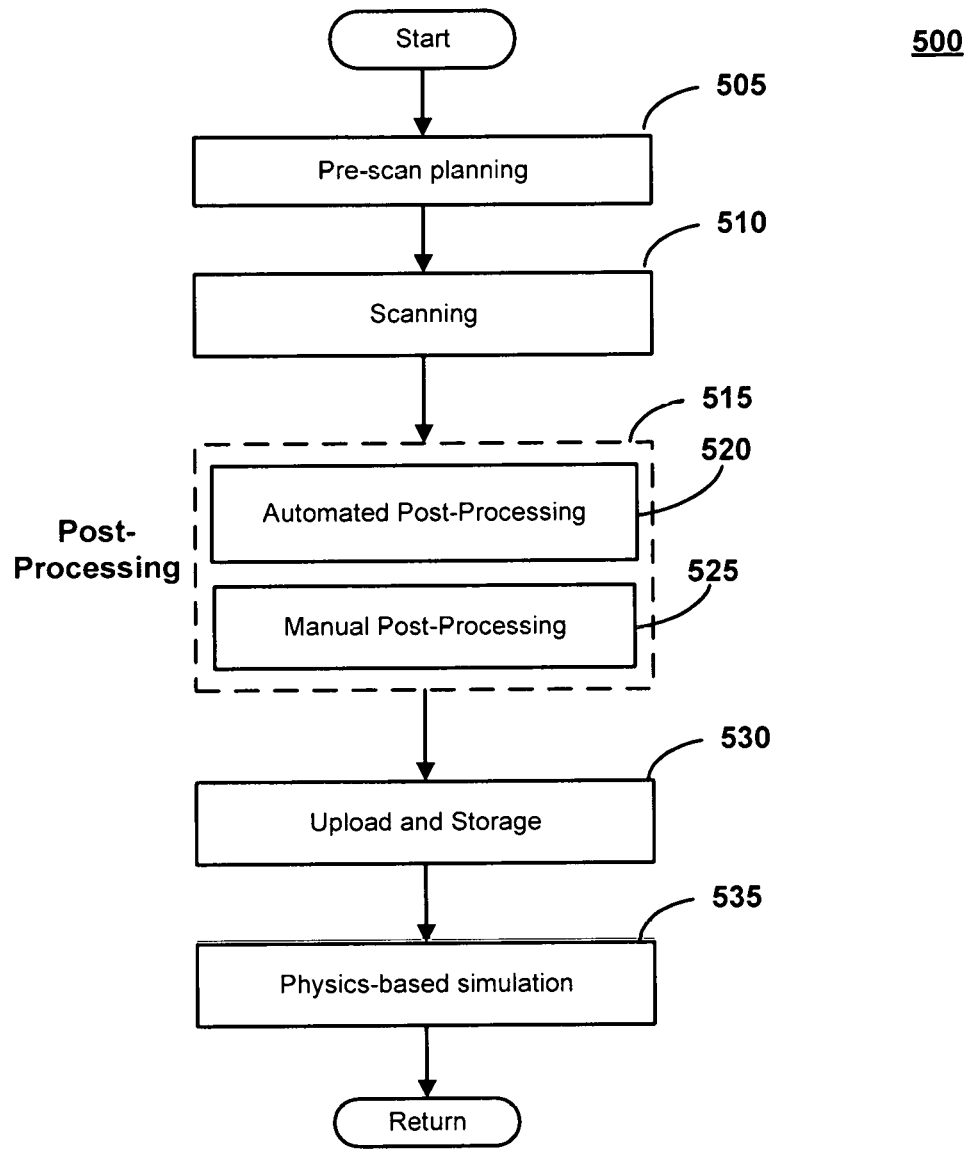
FIG. 5 is a flow diagram illustrating various operations in an asset processing and rendering pipeline as may occur in some embodiments.

FIG. 5 is a flow diagram illustrating various operations in an asset processing and rendering pipeline 500 as may occur in some embodiments. At block 505, the users (e.g., scanning technicians) may perform pre-scan planning. For example, the scanning team may determine if the article will require fiducial placement, the number and nature of the scans, the mannequins, fixtures, etc. to be used. At block 510, the scans themselves may be performed.

At block 515, automated 520 and manual 525 post-processing may be performed on the one or more resulting virtual models. This processing may include separation and stitching as well as various operations to accommodate the physics-based simulation (e.g., metadata introduction regarding physical properties of the article).

At block 530, the virtual asset and metadata may be uploaded to an inventory system (e.g., the inventory system 160). Following, e.g., an interaction with a user of the display or a request by the user, at block 535 the system may provide the virtual asset to display system 110 as part of, e.g., a physics-based rendering.

Figure 6:
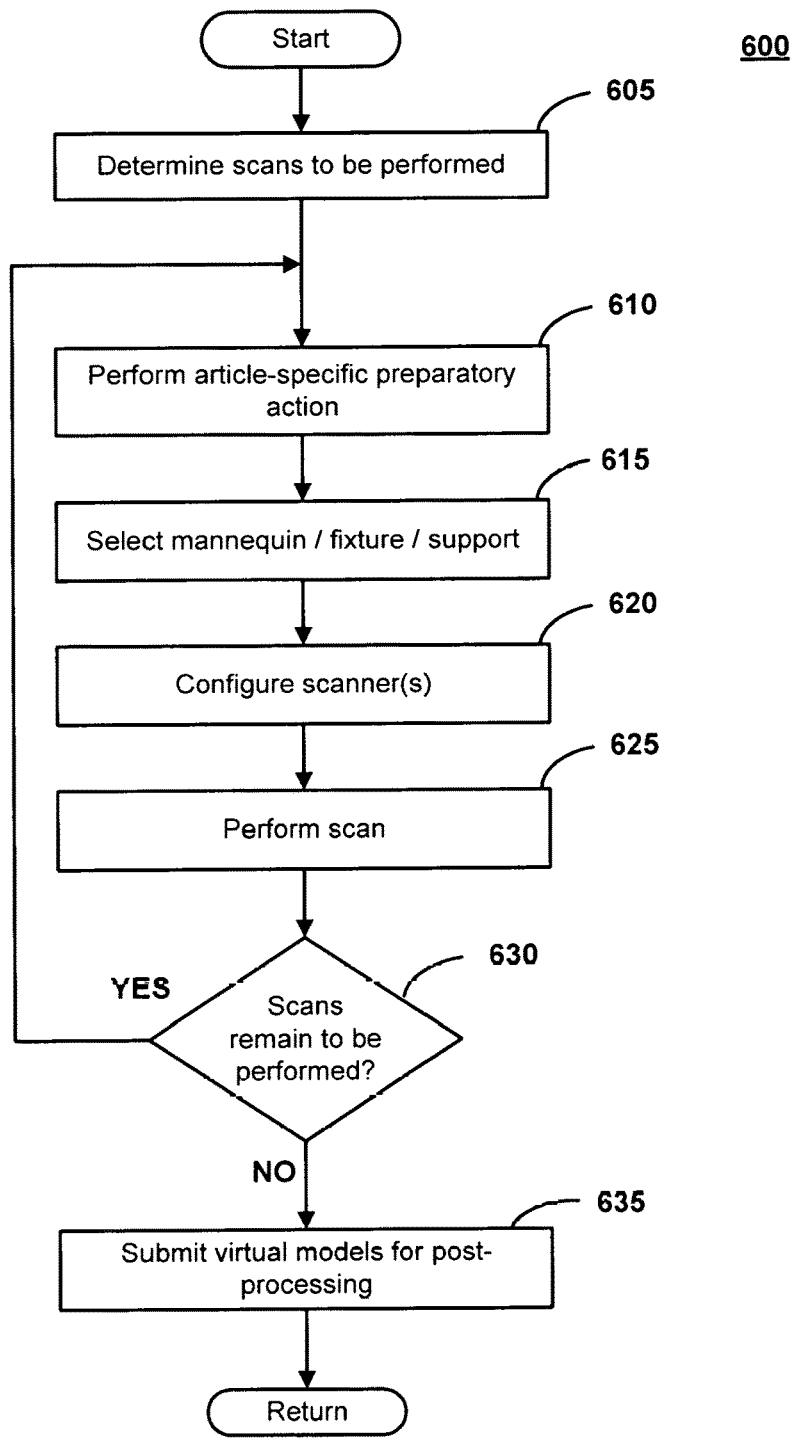
FIG. 6 is a flow diagram illustrating various operations in an asset scanning pipeline as may occur in some embodiments.

FIG. 6 is a flow diagram illustrating various operations in an asset scanning pipeline 600 as may occur in some embodiments. Particularly, the pipeline expands upon operations that may be performed, e.g., at blocks 505 and 510. At block 605, the scanning technicians may determine the scans that will be performed for the article. For example, a bag may be captured with an interior scan, an exterior scan while resting on a platform, and an exterior scan while suspended from a fixture. For each of the scans, blocks 610-625 may be performed until no further scans remain at block 630.

At block 610, the team may perform article-specific preparations. This may include, e.g., rearranging fiducials from a previous scan, changing the orientation or configuration of the article, applying different stresses to the article to facilitate physics-based rendering, etc. At block 615, the team may select the proper mannequin, fixture, or other support for presenting the article in the desired orientation to the scanners. At block 620, the system may configure the scanners—e.g., specifying the depth range, the length along an axis to be scanned, etc.

At block 625, the actual scanning operation may be performed. For example, if the scanning technicians were using an Artec Eva™, the technicians would pass the device around the exterior or within the interior of the article. If the team were using a full scanner e.g., Artec Shapify Booth™, they may proceed to run a full-body scan of the clothing appearing on a mannequin or fixture.

Once the scans and resulting virtual models are completed, at block 635, the virtual models may then be submitted for separation and stitching as part of the post processing. Though separation and stitching may be performed across multiple partial virtual models, one will appreciate that many applications may perform only a single scan of the article. Indeed, it may be easier for an artist or automated system to supplement missing portions (e.g., an occluded face of the article, such as the back-side of a watch or necklace), such as portions 410*a* and 410*b*, rather than incur the time and cost of subsequent scanning. This may be true, e.g., in applications where certain faces or interiors of an article will not be presented to the user during the simulation.

Example Virtual Model Structure

Figure 7A:
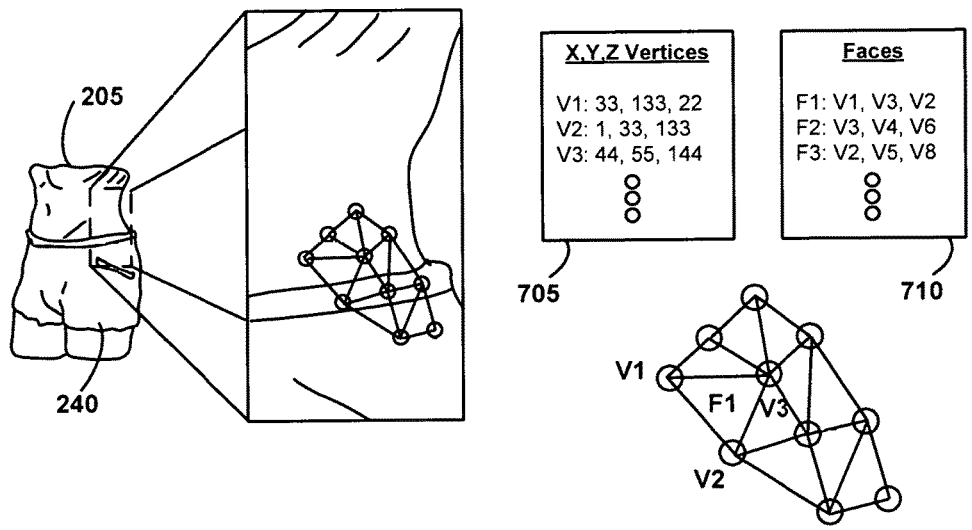
FIG. 7A is a schematic diagram illustrating the vertex and face components that may appear in the virtual model of some embodiments.
Figure 7B:
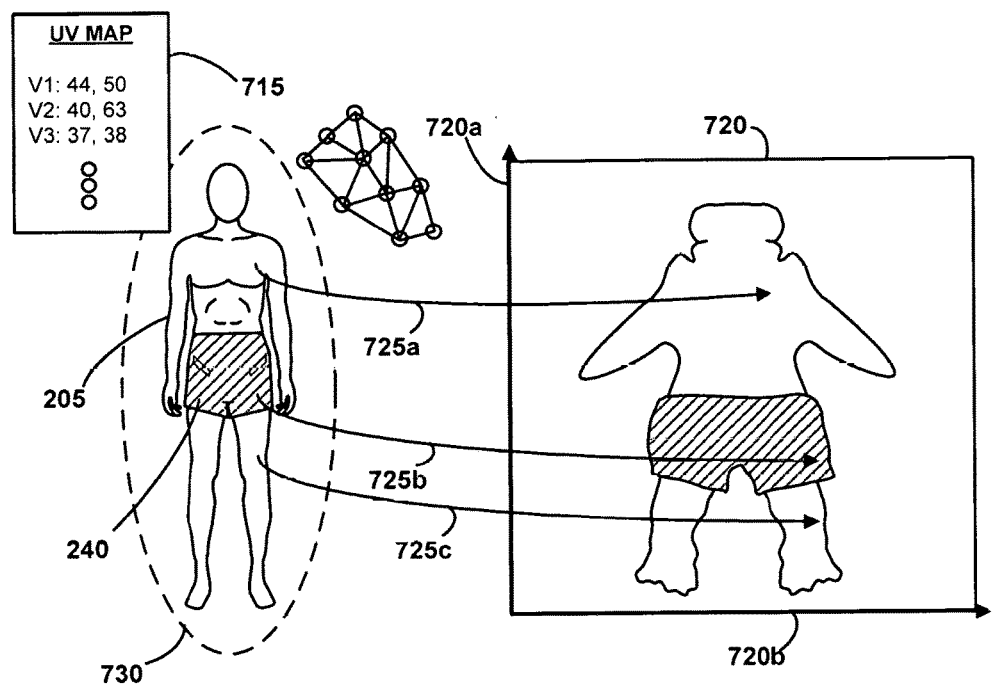
FIG. 7B is a schematic diagram illustrating the relationship between a UV Map and the vertices of a three-dimensional virtual model as may be used in some embodiments.

FIG. 7A is a schematic diagram illustrating the vertex and face components that may appear in the scanned output virtual models of some embodiments. FIG. 7B is a schematic diagram illustrating the relationship between a UV Map and the vertices of a three-dimensional virtual model as may be used in some embodiments. Together, the mesh vertices 705, faces 710, and UV Map 715 may comprise the virtual model prior to any physics-based metadata supplementation.

Vertices 705 may simply indicate the three-dimensional location of mesh vertices, e.g., V1, V2, V3. Though the faces 710, e.g., face F1, may be explicitly identified as groupings and orderings of vertices, one will appreciate alternative representations wherein the faces may be implicitly identified via the vertices 705.

The UV map 715, or any suitable mapping of vertices or faces to corresponding colors acquired during the scan, may also be included in the virtual model. The UV map 715, in this example, may map a given vertex to a two-dimensional point in a projection 720 of the captured texture values. The "U" and "V" may refer to the two axes 720*a* (the "U" axis) and 720*b* (the "V" axis) used to reference texture values.

For example, if the resulting vertex mesh 730 was of the entire mannequin 205 including the shorts 240, then the map would associate various mesh vertices with texture coordinates. Vertices associated with the mannequin would be mapped 725*a*, 725*c* with corresponding texture-captured values of the mannequin in the projection 720. Conversely, vertices associated with the shorts 240 would be mapped 725*b* with corresponding texture-captured values of the shorts in the texture projection 720.

Example Virtual Model Classifier Assisted Removal

As mentioned above, successful separation, e.g., at SEPARATION 1 and SEPARATION 2, may improve subsequent operations in the pipeline 500, possibly including any subsequent manual post-processing operations at block 525 (again, the manual post-processing may occur before and/or after automated post-processing). Various embodiments contemplate the application of a machine-learning method to the separation process to better ensure the removal of non-article portions from the virtual model. In some situations, it may be desirable for such a method not only to be accurate, but to be relatively fast, with little computational overhead, so as not to delay the remainder of the pipelines 500 or 600.

Figure 8:
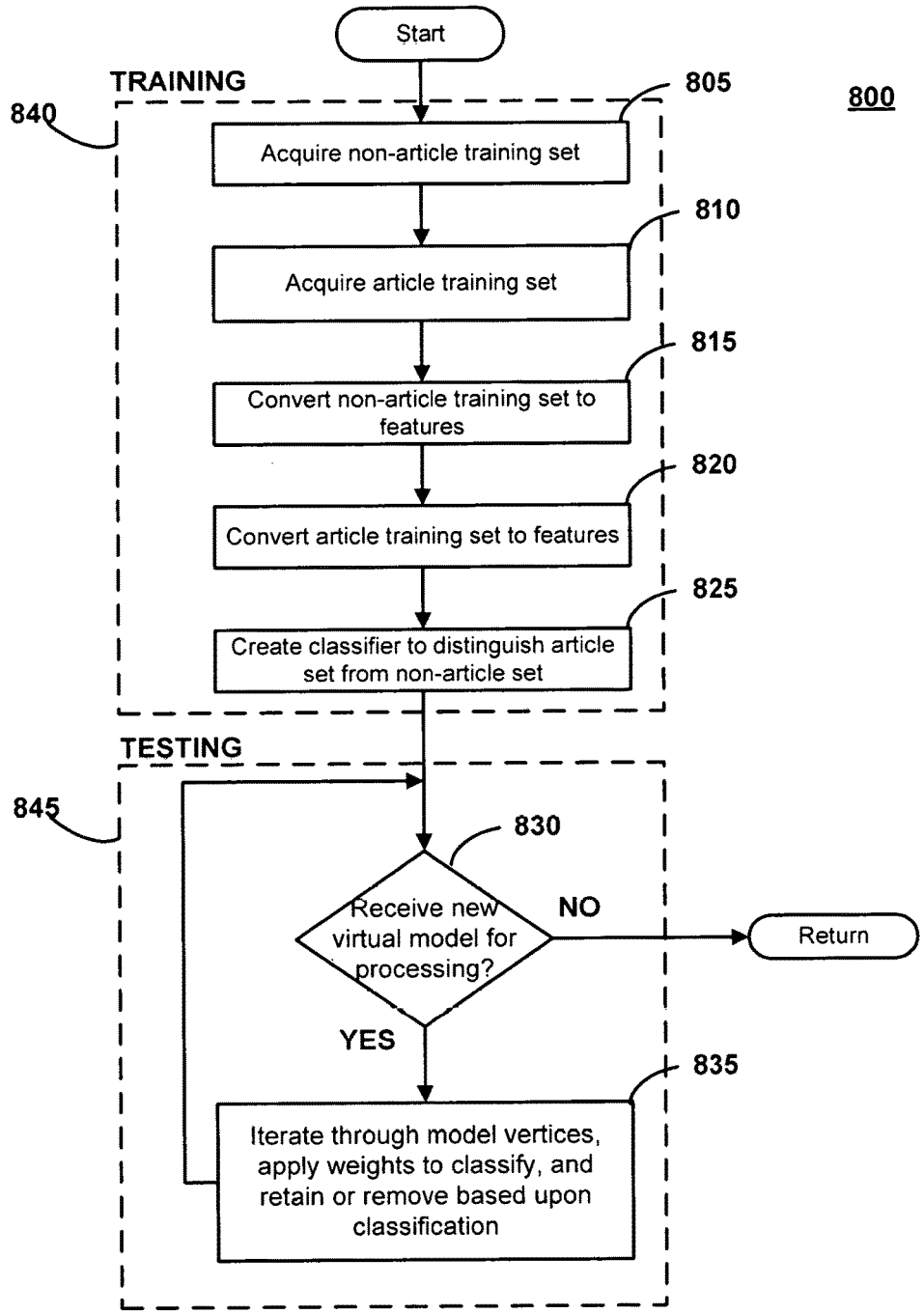
FIG. 8 is a flow diagram illustrating various features of an asset isolation operation performed in conjunction with a virtual model as may occur in some embodiments.

FIG. 8 is a flow diagram illustrating various features of an asset separation operation 800 as may occur in some embodiments. Initially, the system may receive the appropriate datasets for training a classifier at blocks 805 and 810. For example, a technician may have manually identified vertices and/or corresponding colors in one or more of the virtual models which are and are not associated with the asset. If the article were, e.g., a blue blouse and the mannequin and fixture used to support the blouse during scanning were red and green respectively, then the training set may comprise color values from each of the textures with corresponding classifications. The blue color values would be indicated in the training asset as being associated with the article/item class, while the green and red values would be indicated as being associated with the non-article/non-item class.

At blocks 815 and 820, the system may convert the training sets for each of the article and non-article collections of colors to corresponding feature vectors. Feature vectors may better reflect distinguishing features of the respective color groupings than the raw color values themselves. In some embodiments, the feature vector structure may be selected in anticipation of the classifier mechanism to be used. Example feature vectors are described elsewhere herein.

At block 825, the system may apply a classifier, e.g., a Support Vector Machine (SVM), neural network, etc. based upon the article and non-article feature vectors to generate a plurality of classification weights. These weights may then be used at blocks 830 and 835, during "testing," to classify texture color values in one or more incoming virtual models (possibly, but not necessarily, the same virtual models from which the training sets were derived). As described in greater detail herein, at block 835, the system may iterate through the virtual model's vertices, determine the color corresponding to the vertex (e.g., in the UV map), generate the feature vector corresponding to that color, and then determine a classification for the vertex as either "article" or "non-article" based upon the application of the weights to the feature vector. One will appreciate that color classification may proceed separately from vertex removal in some embodiments.

Note that the computer system referenced at each of blocks 805-835 may be the same or different computer systems. For example, in some embodiments one computer system may be dedicated exclusively to performing "training" 840 (e.g., blocks 805-825). Conversely, a second computer system may be dedicated exclusively to classifying various virtual model vertices at blocks 830-835 as part of "testing" 845.

Figure 9:
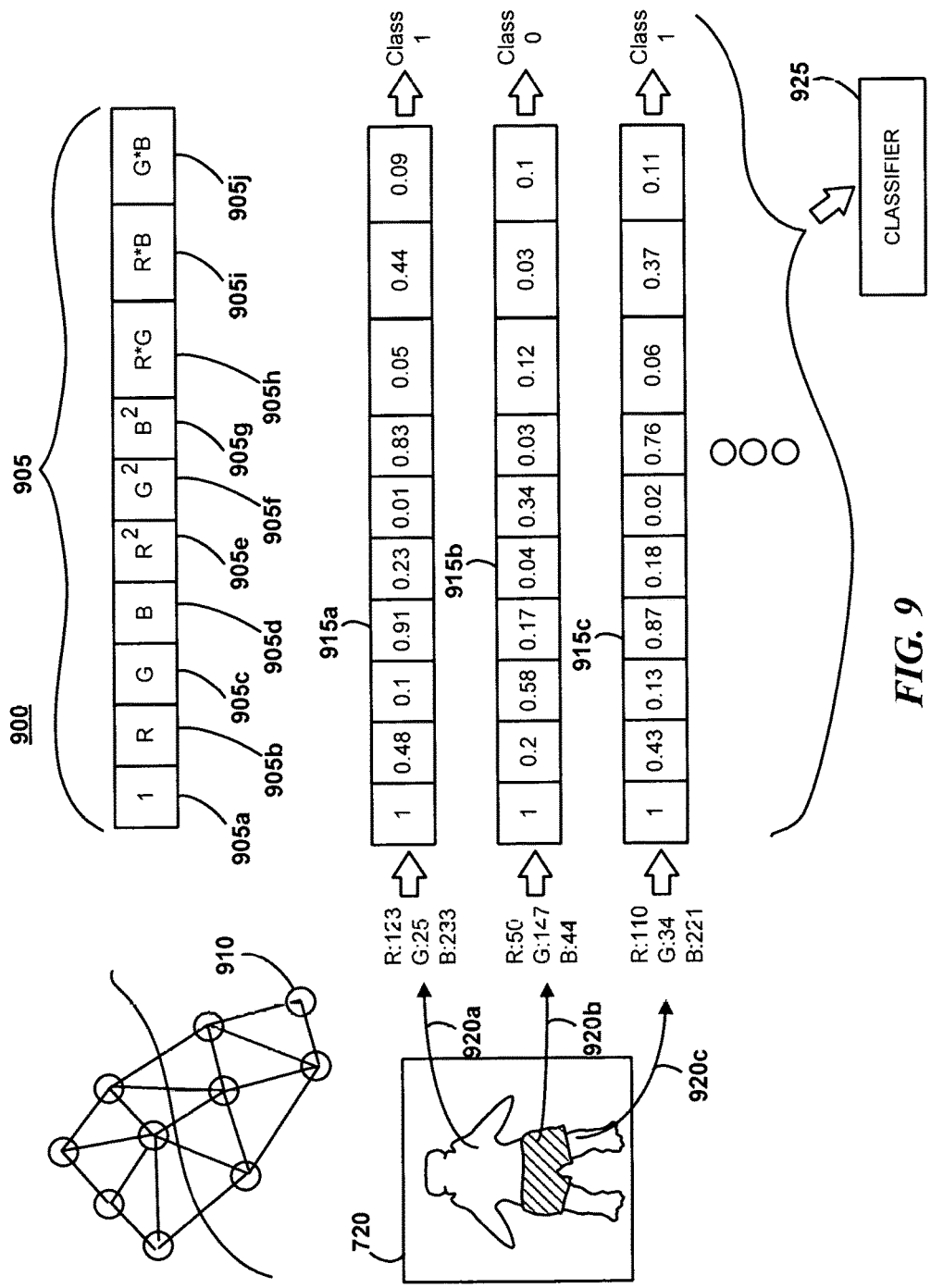
FIG. 9 is a schematic diagram illustrating aspects of an example feature vector and example training set generation as may be implemented in some embodiments.
Figure 10:
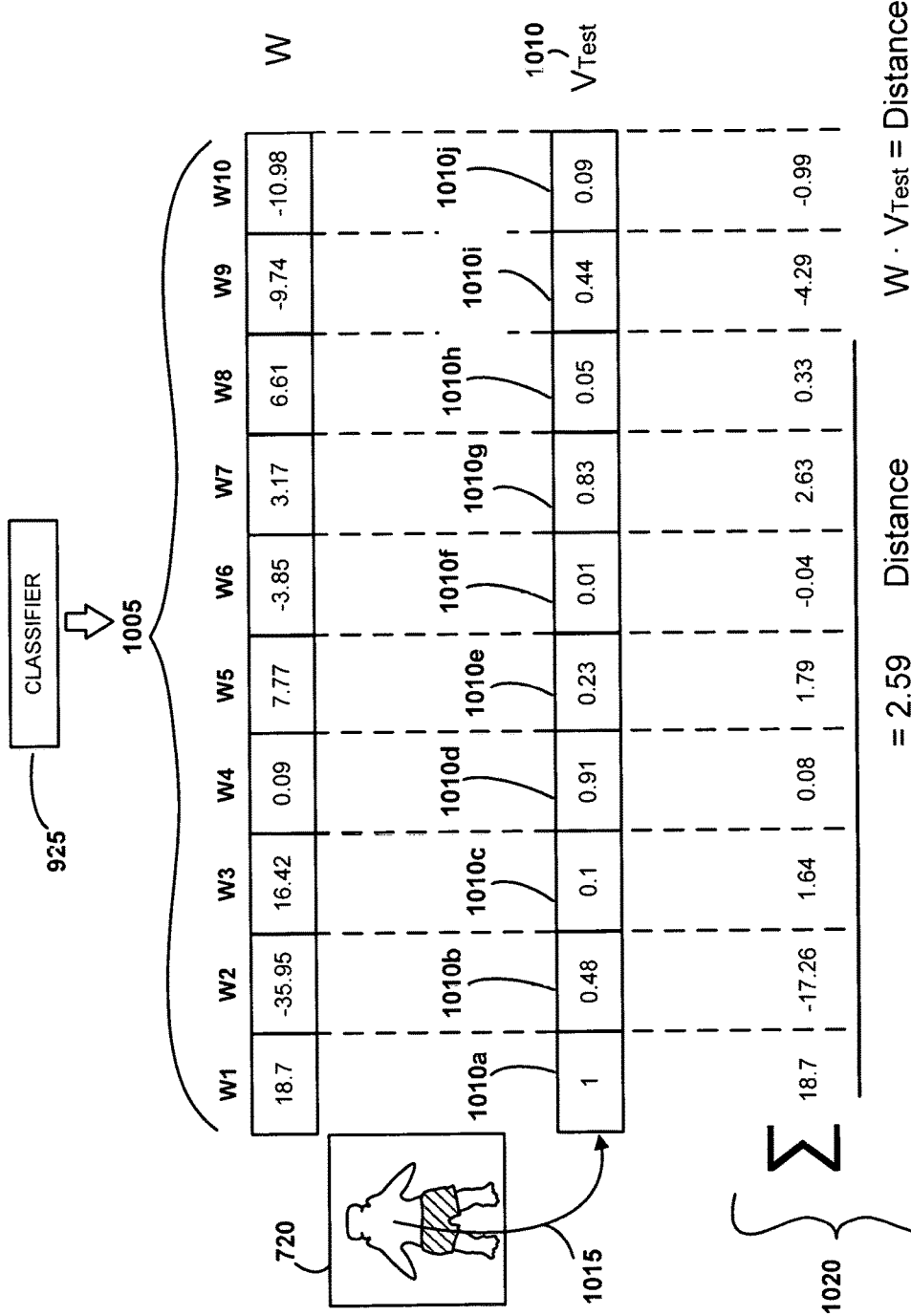
FIG. 10 is a schematic diagram illustrating aspects of an example feature vector and example test vector application as may be implemented in some embodiments.

FIG. 9 is a schematic diagram illustrating aspects of an example feature vector and example training set generation, e.g., as part of the process of FIG. 8, as may be implemented in some embodiments. Particularly, FIG. 9 depicts a training process 900 which may be used, e.g., at blocks 805-825. FIG. 10 is a schematic diagram illustrating aspects of an example feature vector and example test set application as may be implemented in some embodiments. Accordingly, FIG. 10 depicts testing operations which may be used, e.g., at blocks 830 and 835.

With reference to FIG. 9, the system may receive a vertex 910 from the training set identified as either "article" or "non-article." By referencing a UV map 720, the system may identify the corresponding color for the vertex 910 (one will appreciate that this explanation is provided to facilitate understanding and that simply the color may be provided to the system, without specifying a vertex, in some embodiments). The system may take the component values of this color and rearrange them into a feature vector 905 (e.g., as discussed with respect to block 820).

In this example the feature vector 905 comprises ten values, though more, or fewer, as well as a different arrangement of, values may be used than as depicted here. For example, in some embodiments only positions 905e-g may be used and the remaining values omitted, or all these values may be used with several additions. A standard value 905a may facilitate padding or orientation for the classification process. For example, this "bias term" may facilitate hyperplane separators that do not pass through the feature space origin, thereby providing for better color separation.

Where the component values are red, green, and blue values they may be placed at positions 905b, 905c, and 905d respectively (one will appreciate that other color spaces than Red, Green, Blue, for example, CMYK, the Lab color space, etc., may be used instead). Where these values are provided in the range of 0-255, they may be scaled to a value between 0 and 1. Accordingly, red, green, blue values of 123, 25, and 233 would corresponding to values of 0.48, 0.10, and 0.91 (though rounding to two decimals has been used in this example, one will appreciate variations wherein more or less granular values may be used). One will appreciate analogous feature vector positions and values for CMYK, LAB, and other color spaces. Positions 905e, 905f, and 905g may be reserved for squares of the values residing in positions 905b, 905c, and 905d. Consequently, for red, green, blue values 0.48, 0.10, and 0.91, the squared values may be 0.23, 0.01, and 0.83 respectively. Similarly, positions 905h, 905i, and 905j may be populated with multiplied values from positions 905b, 905c, and 905d. For example, for red, green, blue values 0.48, 0.10, and 0.91, the multiplied values of positions 905h, 905i, and 905j may be 0.05, 0.44, and 0.09 respectively.

Thus feature vectors 915a and 915c may be generated from vertices corresponding 920a, 920c with portions of a texture map associated with the non-article (e.g., the mannequin). Accordingly, vectors 915a and 915c may be provided to the system with an association to a "Class 1" (the number being an arbitrary reflection of the association with the non-article category). Conversely, the feature vector 915b may be generated from a vertex having corresponding 920b portions of a texture map associated with the article (e.g., the shorts). Accordingly, this vertex may be provided by a technician or automated training system with an association to a "Class 0" for the article. Dozens, hundreds, thousands, or more of such training vectors may, e.g., be generated for each class. These training vectors and their classifications may then be provided to a classifier 925, e.g., a support vector machine (SVM). Again, while this example discusses providing "vertices" with the "texture map" to the system to facilitate understanding, one will appreciate that training and testing may occur upon only the color values (e.g., only pixel values with classifications are provided to the system for training) without reference to the virtual model. Indeed, in some embodiments, the system may not consider the vertices and texture map themselves until the subsequent virtual model modification. In this manner, training data may be acquired (e.g., using a photographic camera) and used to generate a classifier, even before the virtual scan has been performed. In some embodiments, these feature vectors may be used to classify colors without reference to virtual models at all.

FIG. 10 then depicts how the classifier's output may be used to determine whether color values (and corresponding vertices) are associated with an article or with a non-article. The classifier 925 may output a plurality of weights W1-W10 1005 corresponding to each of the feature vector positions. In this example, as indicated in Equation 1, below, the dot product of this weighted vector with a color value's feature vector may produce a metric value D, which may be used to classify the color.

$$W \cdot V_{Test} = D \quad (1)$$

FIG. 10 depicts this operation visually. In this example, a vertex associated 1015 with the non-article (e.g. "mannequin") portion of the texture map may produce a color feature vector 1010 having values 1010a-j. When multiplied and summed 1020 with the corresponding weights W1-W10 in accordance with the dot product operation, the resulting "distance" of 2.59 may be used to classify the vertex as "non-article." In this example, distance values less than 0 (i.e., negative) may be construed as "article" whereas values greater than 0 (i.e., positive) may be construed as "non-article." One will appreciate that this is merely a schematic example to facilitate understanding and that various implemented embodiments may reverse the classification, append scaling and offset factors, etc. based, e.g., upon empirical assessments of the classification results. In addition, while the operations of FIGS. 9 and 10 are discussed with specific reference to clothing identification, one will appreciate that some embodiments may be applied in any situation where color-based separation is desired. For example, the vector structure 905 and classified techniques described herein may be used in analyzing satellite imagery, distinguishing color-identified assembly line items, recognizing red, yellow, and green stop lights, etc.

Example Feature Vector Structure Benefits for Linear Classifiers

Linear classifiers may facilitate lower overhead and less computational complexity than non-linear classifiers. While the values in positions 905e-905j may be derived from the values in 905b-905d, and consequently are not independent, the "spread" they produce may better facilitate classification with a linear classifier. While depicting all the possible dimensions of vector 905 in this paper application isn't feasible, FIGS. 11A-11C and FIG. 12A-D instead provide schematic representations in two and three dimensions to provide the reader with visual intuition for the benefits of positions 905e-905j.

Figure 11A:
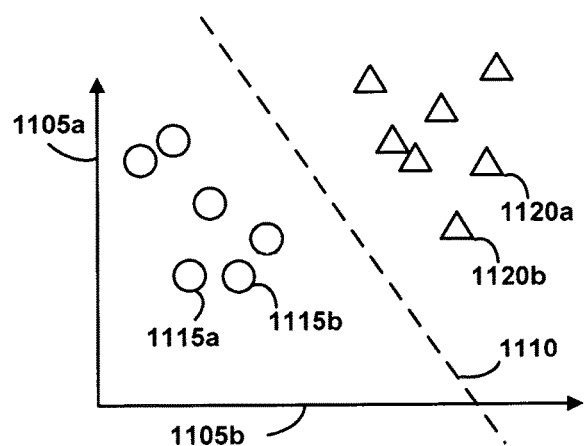
FIG. 11A is a schematic two-dimensional plot of an idealized linear classifier provided to facilitate the reader's intuition.

FIG. 11A depicts an "ideal" situation, where two-dimensional (i.e., dimensions 1105a and 1105b) data points from a first class (comprising, e.g., points 1115a and 1115b, represented here by circles) may be separated by a linear separator 1110 from points in a second class (comprising, e.g., points 1120a and 1120b, represented by triangles). Points in the first class may, e.g., correspond to the texture color values of a non-asset item (such as a mannequin) and the points in the second class to the texture color values of an asset, as represented by a hypothetical two-dimensional feature vector (e.g., a vector with only positions 905b and 905c). Again, RGB data values would naturally appear in three dimensions and the feature vector structure 905 may have 10 dimensions (when including position 905a) if all the depicted positions were included. Accordingly, one will appreciate that these example point values are not necessarily to scale or representative of a real-world application, but are instead provided merely to facilitate the reader's understanding.

Figure 11B:
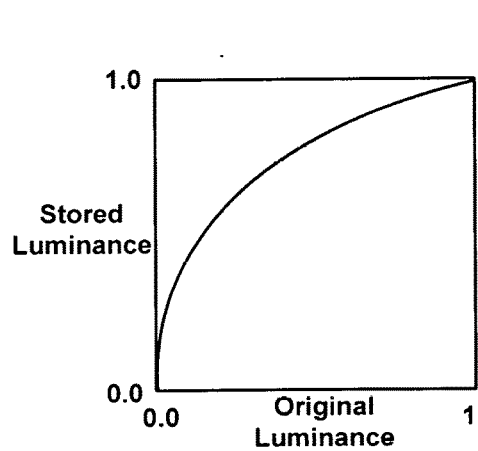
FIG. 11B is a two-dimensional plot of a gamma correction factor as may be applied by scanners in some embodiments.

Unfortunately, the ideal, clean linear separation of FIG. 11A is not always immediately available using raw scanner texture captures. Particularly, the scanner's, or other image capturing device's, "gamma correction" may often adjust color values perceived at the device to values believed to better correspond to human vision or for rendering on a computer monitor. For example, some imaging devices may store images in the sRGB unsigned integer format. FIG. 11B plots a correspondence between raw "Original Luminance" values and their "Stored Luminance" counterparts as may be implemented by some imaging devices. For example, a value perceived as a 0.5 (or roughly 128 on a 256 value scale) luminance value by the scanner's camera sensor may be stored closer to the value 0.72 in the scanner's texture result. While this correspondence may follow a roughly $$output = input^{\frac{1}{2}}$$

function, many scanners may use more complicated nonlinear relationships.

Figure 11C:
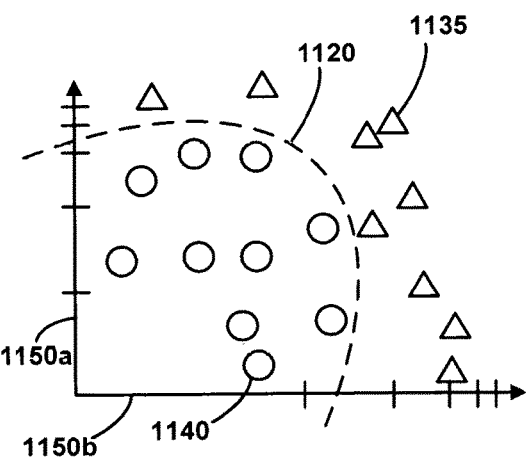
FIG. 11C is a schematic two-dimensional plot of various color feature vectors as they may be distributed along dimensions pursuant to the gamma correction factor of FIG. 11B, and a corresponding non-linear classifier.

This relationship may result in the nonlinear placement of successive luminance values as shown in FIG. 11C. As schematically indicated by the exaggerated axes of FIG. 11C, the non-linear relation may cause many scanned color values to congregate further away from the origin. Such displacement may make linear separation difficult or impossible. While non-linear SVMs may be used in some embodiments to apply a nonlinear separator (e.g., separator 1120), the additional complexity involved may be undesirable for certain rapid clothing scanning and other applications. In fact, in some instances, non-linear separators may even be less effective than applying a linear separator in conjunction with the methods and structures disclosed herein.

Rather than require the use of a nonlinear separator, feature vector structure 905 may instead introduce additional dimensions that mitigate, at least in part, the distortive gamma correction. These new dimensions may be more "linear" and thereby accommodating to linear separation. For example, the squaring of values in positions 905e-905g may have the effect of roughly compensating for the gamma correction of FIG. 11B. Multiplying values at positions 905h-905j may likewise produce more linear dimensions, but may also serve to mitigate correction idiosyncrasies for a single color component. In some experimental runs, using only positions 905a-905g in the feature vector for a linear SVM classifier precipitated a 1.11% classification error, while usage of vectors having all of positions 905a-905j on the same training and test data, with the same classifier, precipitated only a 0.45% error. For large scanning sessions, such reduced error percentages may save considerable time and effort.

To facilitate an intuitive understanding of these benefits, FIG. 12A is a schematic three-dimensional view of the color feature vectors of FIG. 11C. As indicated, one class of vectors, e.g., vector value 1140 is represented by circles, and another class of vectors, e.g., vector 1135, is represented by triangles. Without the addition of another dimension to the feature vectors (e.g., as facilitated by one or more of positions 905e-905j), linear separation may be difficult or impossible with a linear classifier.

FIG. 12B is a schematic three-dimensional view of FIG. 12A's feature vectors following introduction of an additional linear dimension 1205 (analogous, e.g., to the effect of introducing one of positions 905e-905j), as well as a linear hyperplane 1210 facilitating separation of the two classes. As indicated in FIG. 12B, each feature vector position (again, in either the test or training sets) may now be "raised" in accordance with its component value for dimension 1205. As indicated by the exaggerated increment placement on the axes, dimension 1205 may be more linear and evenly incremented than dimensions 1150a and 1150b. Dimension 1205 may correspond, by analogy, to any one of the squares or products depicted in the example of FIG. 9. In this example, vector value 1140 remains close to the plane of the 1150a and 1150b axes at position 1215b. In contrast, vector 1135 has been raised considerably from the 1150a and 1150b axes to the position 1215a. In this example, this "staircasing" of values in the new dimension accommodates linear separator 1210 which is shown as a solid plane in FIG. 12C to more clearly depict the separation of the first class (circles) from the second class (triangles).

FIG. 12D is a schematic two-dimensional plot comparing gamma corrected and more linearized color dimensions. For example, the square and multiplied values in 905 may more closely resemble a linear input relation 1225b, rather than the raw, gamma corrected values 1225a. Including more dimensions in the feature vector may also provide more opportunities for finding a separator, or for finding a more robust separation. Many clothing textures comprise several values and materials may behave differently under different lighting conditions. Accordingly, feature vectors comprising a wider range of dimensions based upon the raw color component values may more readily facilitate the SVM's (or other classifier's) identification of the maximally separating hyperplane (or corresponding classification mechanism) between the article and non-article training sets. Feature vector structure 905 may accomplish these benefits when used in conjunction with a linear SVM, while providing a format amenable to rapid feature vector generation and consequently faster training and testing. While one will appreciate that similar separations may be achieved using a non-linear kernel in an SVM, the use of a linear SVM may speed up training, facilitating the rapid consideration of different mannequin/fixture and article combinations. Such speed may be very beneficial when a large and disparate number of articles must be scanned in a limited amount of time. Again, as mentioned above, use of these color-based separation techniques need not be limited to the domain of clothing and non-clothing identification.

Example Post-Classification Removal Process

Figure 13:
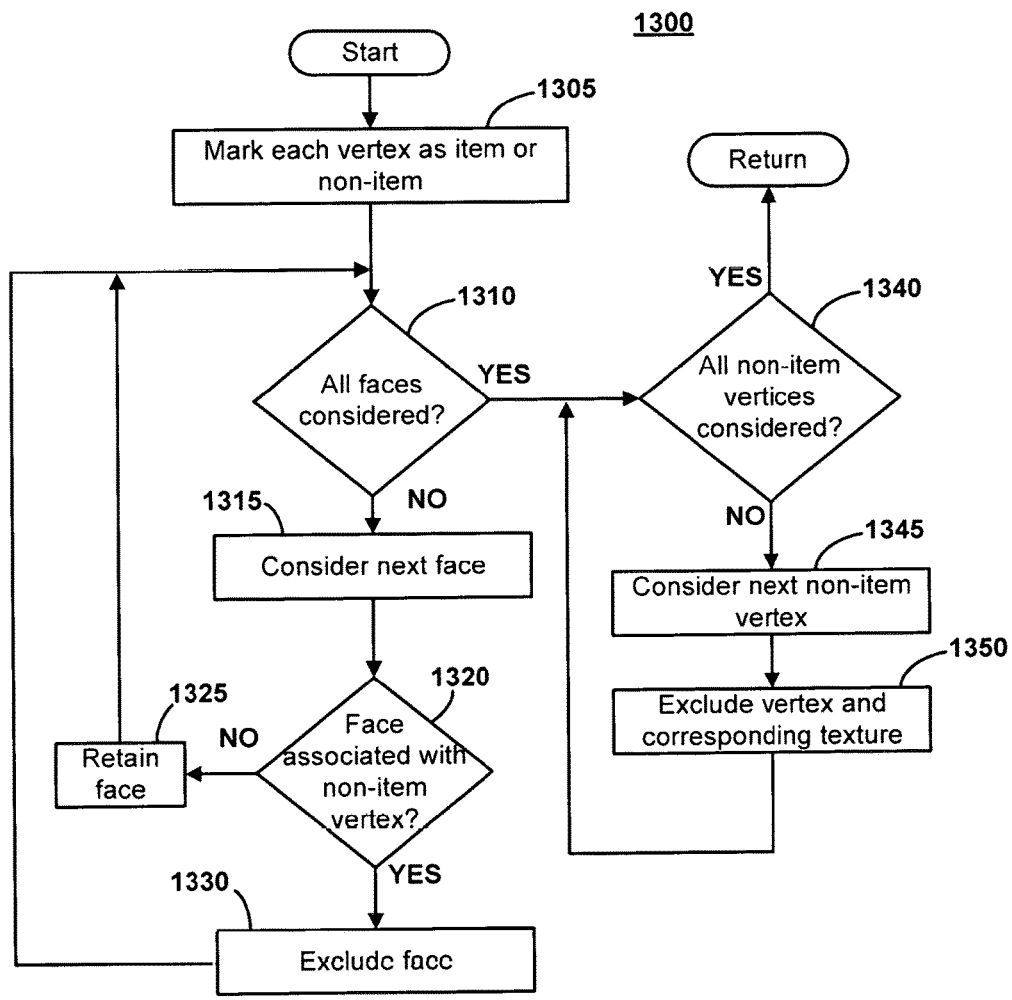
FIG. 13 is a flow diagram illustrating various operations in a face, vertex, and texture removal process following color classification as may occur in some embodiments.

FIG. 13 is a flow diagram illustrating various operations in an example face, vertex, and texture removal process 1300 following vertex color classification as may occur in some embodiments. Particularly, following classification, a processing system may modify the original scanned data structures to omit textures, vertices, and faces associated with objects other than the item of interest (e.g., removal of a mannequin while retaining clothing). The data structure corresponding to the scanning results may comprise, e.g., a vertex array, a face array (indicating, e.g., triples of vertices), and a texture map (relating a vertex to a color value). Each of the vertex array, face array, and texture map may be adjusted by the process of FIG. 13, so that only, or substantially only, item-related data remains after processing.

At block 1305, the processing system may distinguish the item and non-item classified vertices. For example, during, or following testing classification, a "flag" value may be associated with each vertex, indicating the vertex's class, such as in a hash array or dictionary data structure. In some embodiments, absolute black is unlikely to appear in the real-world texture and the system may instead mark non-item classified vertices by "zeroing" their corresponding texture values in the texture map (one will appreciate that other designated color values may be suitable in some contexts). Similarly, or alternatively, non-item vertices may be moved to the origin if the origin (or any other suitable position) is not used for scanned values.

Once the vertices are associated with their classification, at block 1310, the system may begin determining which faces should be removed. For each considered face 1315 in the data structure, the system may determine if the face is associated with a non-item vertex at block 1320. For example, if any one of the vertices associated with a face is marked as a non-item vertex, the face as a whole may be removed, modified, ignored, or otherwise excluded at block 1330. Conversely, if all the face's vertices are classified as belonging to the item, then the face may be retained at block 1325.

Once all the faces have been considered at block 1310, the system may iterate through all the non-item associated vertices at block 1340. Each of these vertices at block 1345 and their corresponding texture values may then be excluded at block 1350. These iterations may continue until all, or substantially all, the non-item data has been removed.

To further facilitate understanding, FIG. 14 is a pseudocode listing depicting one possible implementation of the process of FIG. 13. Particularly, FIG. 14 provides a function "maskMesh" which takes as arguments the vertices, faces, and texture map acquired after testing and classification have been performed on the incoming data (line 1). At lines 3-7, the system may iterate through the vertices (line 3). If the classification for the color mapped to the vertex corresponds to a non-item (line 5), the system may move the vertex to the origin (line 6) (though, as mentioned, one will appreciate a variety of ways to mark a vertex as corresponding to a particular classification, e.g., by adjusting its corresponding texture color, changing a flag value, etc.). The "classification_for_color" function referenced at line 5 may, e.g., perform the testing operation of FIG. 10 to assign a class. One will appreciate variations, however, e.g., where the system previously determined a classification for most of the texture values in the scan and classification_for_color instead performs a table lookup on those results. This variation may be particularly useful where many similarly textured items are scanned for processing and the table may, at least in part, be reused.

Once the vertices are marked based upon their corresponding texture color's classification, the system may proceed to store the redacted mesh data in the return variables faces_to_keep, vertices_to_keep, and texture_map_to_keep (lines 9-28). In this example, the system may iterate through the faces (lines 13-26) and identify faces having all three vertices classified as corresponding to the item (line 15). The face may be retained (line 17) as well as its vertices (lines 18-20), and the corresponding texture color values (lines 21-23).

Although new data structures faces_to_keep, vertices_to_keep, and texture_map_to_keep are used to store the returned results in this example, one will appreciate that alternative methods may be readily employed. For example, in some embodiments, the function may receive the vertices, faces, and texture_map values by reference or by pointer to a memory location. In such situations, these data structures may be overwritten and used as the returned values (where the structures are "passed by reference" a return value may not be necessary). Non-item values appearing earlier in an array or map may be overwritten with subsequent item-classified or retained values. A variable indicating the array or map's end position (e.g., the last allocated portion in memory) may then be moved forward to exclude entries after the last item-classified value has been moved forward in the array.

Rules-Based Vertex Removal and Classifier Variations

Figure 15A:
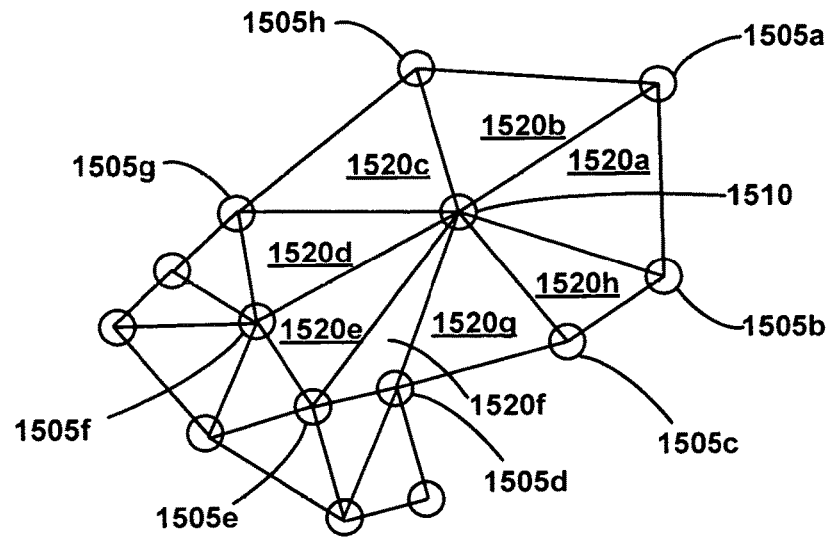
FIG. 15A is a schematic view of a plurality of vertices in a virtual model prior to a vertex removal as may occur in some embodiments.
Figure 15B:
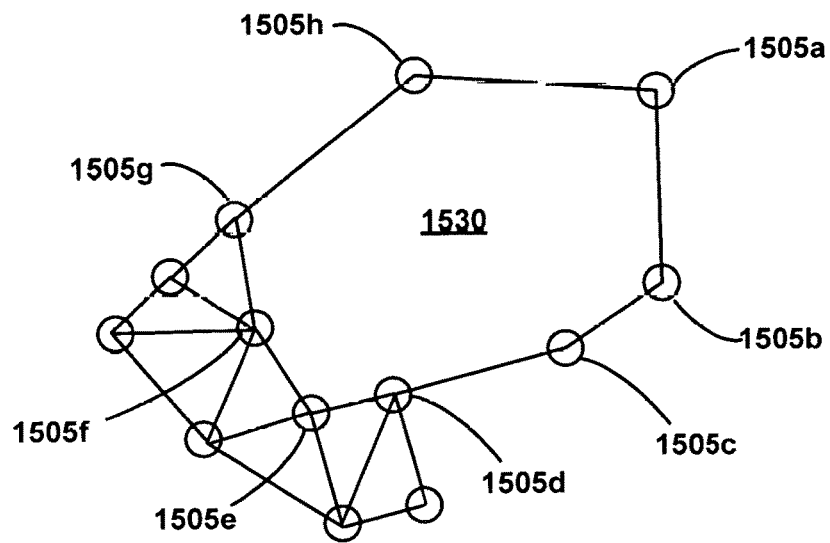
FIG. 15B is a schematic view of a plurality of vertices in a virtual model after vertex removal as may occur in some embodiments.

Though many embodiments may provide satisfactory virtual models using the systems and methods described above exclusively, some embodiments may employ a rules-based system to supplement vertex removal decisions. For example, FIG. 15A is a schematic view of a plurality of vertices in a virtual model prior to a vertex removal as may occur in some embodiments. FIG. 15B is a schematic view of a plurality of vertices in a virtual model after accounting for a vertex removal as may occur in some embodiments. For highly granular scans, involving possibly hundreds, thousands, or even millions of vertices per square inch, it is unlikely the case that a single vertex 1510 in one class would be surrounded by vertices 1505*a-h* of another class. If the vertex 1510 were removed, e.g., faces 1520*a-h* would disappear. In some embodiments, the space at location 1530 may be left empty or new faces may take the place of faces 1520*a-h*. Whether the faces are replaced or removed, improper vertex removal may reduce the quality of the virtual model. For example, the normal vectors of new faces are unlikely to be exactly the same as the normals associated with the original faces 1520*a-h*. Similarly, if the removed faces are not replaced, the creation of too many holes for removed "false positive" vertices that are actually part of the item being scanned, would be unfavorable. Consequently, if vertices such as vertex 1510 are erroneously removed many times, in the aggregate, they may change the texture and granularity of the resultant virtual asset. For example, post-processing may include the conversion of large vertex count mesh virtual assets to lower vertex count meshes with bump maps so as to reduce the memory overhead. Incorrect vertex removal may result in an incorrect bump map and consequently a lower fidelity representation of the clothing article.

Figure 16:
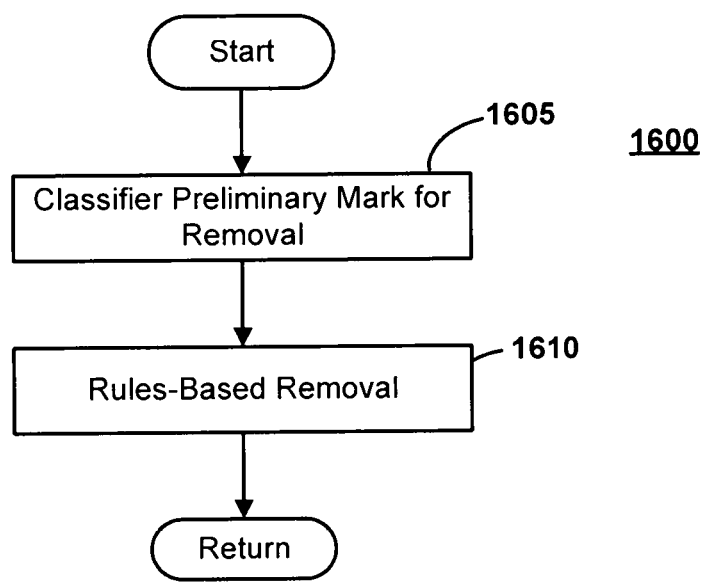
FIG. 16 is a flow diagram illustrating various operations in a classifier and rules-based asset separation pipeline as may occur in some embodiments.

To avoid this and similar undesirable outcomes, the classification determination and subsequent retention/removal at block 835 may include the application of various "rules" to ensure that removal or retention of a vertex is appropriate. FIG. 16 is a flow diagram illustrating various operations in a classifier and rules-based asset separation pipeline 1600 as may occur in some embodiments. For example the operations of pipeline 1600 may occur in block 835. At block 1605, the classifier weights may be used to make a preliminary determination whether vertex removals are appropriate and each vertex "marked" accordingly. This preliminary determination may, for example, occur prior to the process of FIG. 13. "Marking" for removal may be equivalent to assigning a vertex a "non-item" class.

After making a preliminary determination for the vertex, the system may apply rules at block 1610 for the marked vertices. Some rules may consider vertices and their neighbors' marking, e.g., to avoid removing vertices surrounded by "item" classified vertices as described above. Accordingly, some rules' application may require successive iterations over the vertex mesh, as neighboring vertex markings may change with some iterations. In addition to accounting for mesh-based anomalies, rules may also be used to facilitate artistic improvement to the virtual asset.

Figure 17:
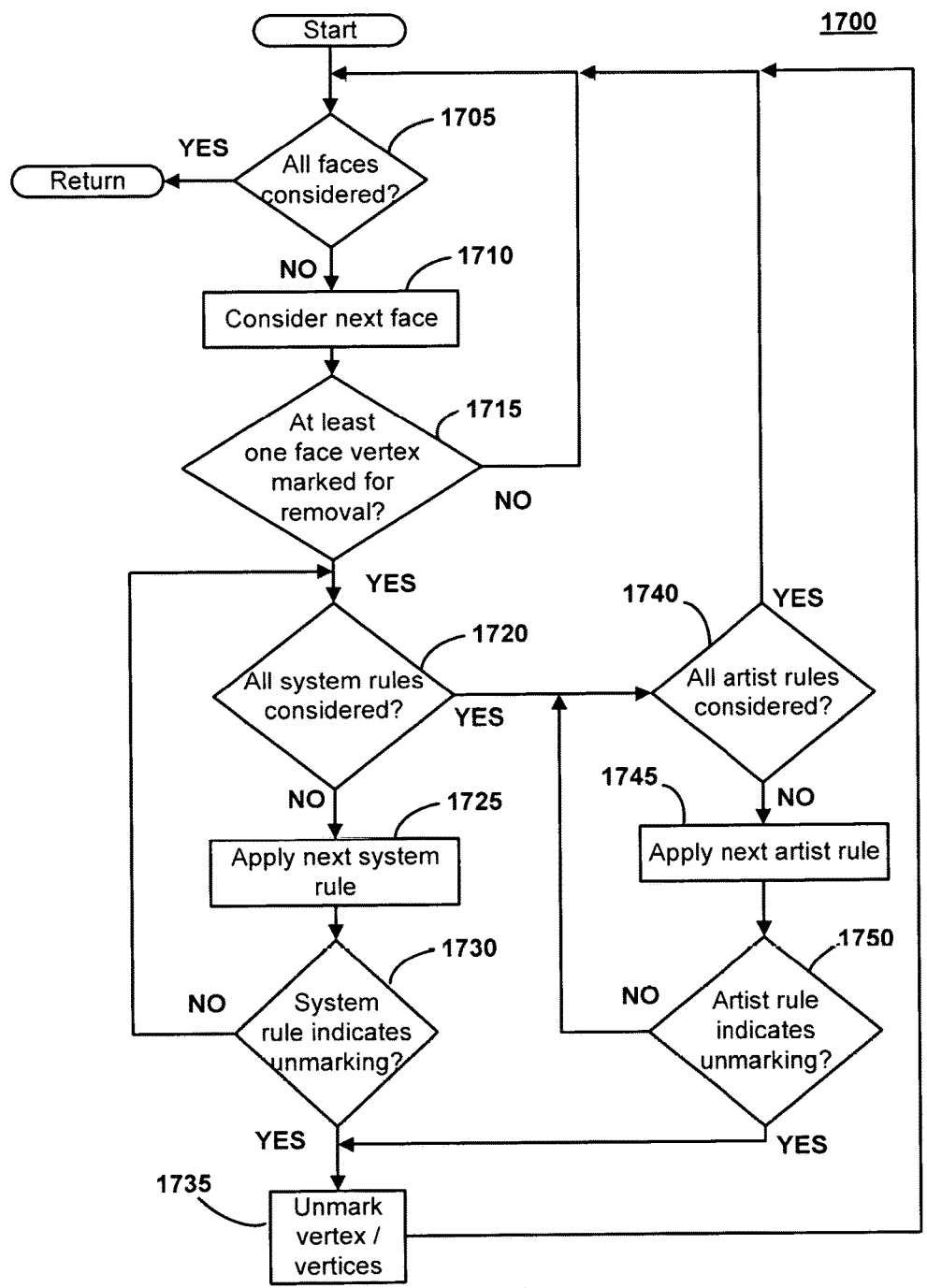
FIG. 17 is a flow diagram illustrating various operations in a rules-based virtual model refinement process as may occur in some embodiments.

FIG. 17 is a flow diagram illustrating various operations in a rules-based virtual model refinement process 1700 as may occur in some embodiments. Though this example iterates through faces, one will appreciate variations wherein edges are considered, or wherein vertices are considered directly. At blocks 1705 and 1710, the system may consider as-yet unhandled faces of the virtual model mesh. If the face contains at least one face marked for removal (e.g., containing a vertex marked for removal) at block 1715, e.g., as determined and marked in the preceding block 1605, then the system may proceed to apply the relevant rules to ensure removal is appropriate. One will appreciate that some embodiments likewise apply a set of rules when the vertex is marked for retention. Again, "marking" or "unmarking" a vertex may simply involve changing its assigned classification (consequently, e.g., "classification_for_color" in FIG. 14 may be replaced with a "classification_for_vertex" which takes a particular vertex as an argument and references, e.g., a hash table to determine the classification marking).

In this example, rules may be divided into "system" and "artist" rules. System rules may be those which account for anomalies, e.g., as described in FIGS. 15A-B, precipitated by the character and parameters of the scanning equipment. For each system rule considered at blocks 1720 and 1725 the system may unmark 1735 the vertex identified for unmarking at block 1730 (e.g., when a situation as described with respect to FIGS. 15A and B occurs). While FIG. 17 offers rules to prevent removal of a vertex marked for removal, one will appreciate that rules may also be structured so as to remove a vertex marked for retention.

Artist rules may instead address situations where the artist wishes to retain or remove a vertex to facilitate manual correction. For example, lacework, tassels, zippers, buttons, and various other article features may result in ambiguous vertex models. In some instances, e.g., where lacework is semitransparent, the system may readily classify such portions of the assets as "non-article." In some instances, the artist may have deliberately marked such accessories with a non-asset color to segregate the accessory for individual consideration (e.g., using a marker 370). Thus, the artist may, e.g., prefer to simply retain erroneous model vertices and make a correction by hand. Absent the vertices' retention (or conversely for rules applied to retained vertices, removal) the artist may have too little information to make a correction, or too much obfuscating noise to make the correction. Consequently, at blocks 1740, 1745, and 1750 the artist rules may be considered and the vertex retained where a rule is satisfied.

Computer System

Figure 18:
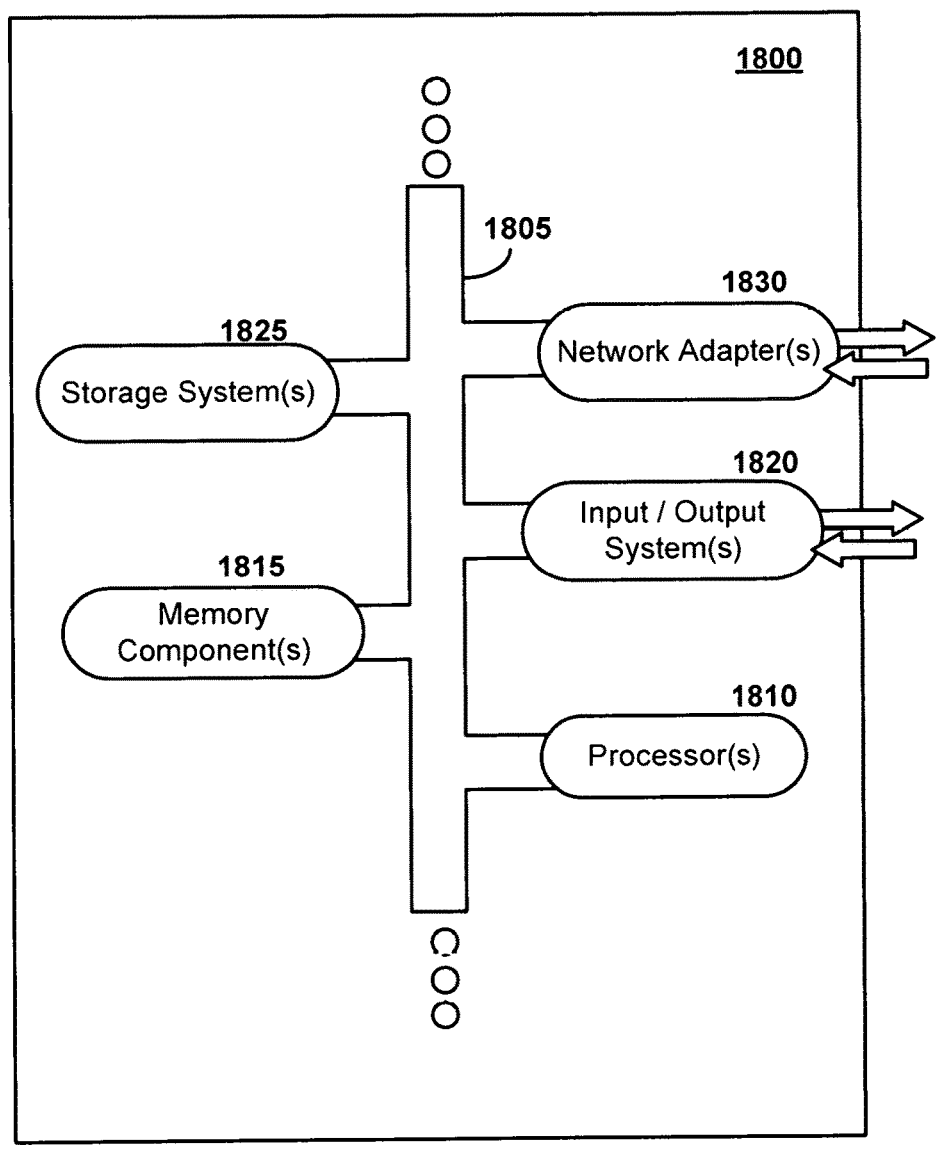
FIG. 18 is a block diagram of an example computer system as may be used in conjunction with some of the embodiments.

FIG. 18 is a block diagram of an example computer system as may be used in conjunction with some of the embodiments. The computing system 1800 may include an interconnect 1805, connecting several components, such as, e.g., one or more processors 1810, one or more memory components 1815, one or more input/output systems 1820, one or more storage systems 1825, one or more network adaptors 1830, etc. The interconnect 1805 may be, e.g., one or more bridges, traces, busses (e.g., an ISA, SCSI, PCI, I2C, Firewire bus, etc.), wires, adapters, or controllers.

The one or more processors 1810 may include, e.g., an Intel™ processor chip, a math coprocessor, a graphics processor, etc. The one or more memory components 1815 may include, e.g., a volatile memory (RAM, SRAM, DRAM, etc.), a non-volatile memory (EPROM, ROM, Flash memory, etc.), or similar devices. The one or more input/output devices 1820 may include, e.g., display devices, keyboards, pointing devices, touchscreen devices, etc. The one or more storage devices 1825 may include, e.g., cloud based storages, removable USB storage, disk drives, etc. In some systems memory components 1815 and storage devices 1825 may be the same components. Network adapters 1830 may include, e.g., wired network interfaces, wireless interfaces, Bluetooth™ adapters, line-of-sight interfaces, etc.

One will recognize that only some of the components, alternative components, or additional components than those depicted in FIG. 18 may be present in some embodiments. Similarly the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 1830. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 1815 and one or more storage devices 1825 may be computer-readable storage media. In some embodiments, the one or more memory components 1815 or one or more storage devices 1825 may store instructions, which may perform or cause to be performed various of the operations discussed herein. In some embodiments, the instructions stored in memory 1815 can be implemented as software and/or firmware. These instructions may be used to perform operations on the one or more processors 1810 to carry out processes described herein. In some embodiments, such instructions may be provided to the one or more processors 1810 by downloading the instructions from another system, e.g., via network adapter 1830.

Remarks

The drawings and description herein are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only, and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner, may contain more or less information than shown, may be compressed and/or encrypted, etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference herein to "an embodiment" or "one embodiment" means that at least one embodiment of the disclosure includes a particular feature, structure, or characteristic described in connection with the embodiment. Thus, the phrase "in one embodiment" in various places herein is not necessarily referring to the same embodiment in each of those various places. Separate or alternative embodiments may not be mutually exclusive of other embodiments. One will recognize that various modifications may be made without deviating from the scope of the embodiments.

I claim:

1. A computer system comprising:
   at least one processor;
   at least one interface configured to receive a scanned virtual model;
   at least one memory comprising instructions configured to cause the system to perform a method separating a plurality of vertices associated with a clothing asset from a plurality of vertices associated with one or more objects other than the clothing asset, the method comprising:
      receiving a first set of color values associated with the clothing asset;
      receiving a second set of color values associated with a non-clothing object;
      generating a first plurality of training feature vectors from the first set of color values;
      generating a second plurality of training feature vectors from the second set of color values;
      determining a plurality of feature component weights by providing the first plurality of feature vectors and the second plurality of feature vectors to a classifier;
      receiving, via the at least one interface, the virtual model, the virtual model comprising:
         a plurality of vertices, a first set of the plurality of vertices associated with clothing asset data and a second set of the plurality of vertices associated with non-clothing asset data; and
         a map associating each vertex from the plurality of vertices with a corresponding color value; and
      for a vertex of the plurality of vertices:
         determining a color value associated with the vertex in the map;
         generating a test feature vector based upon the color value;
         applying the plurality of feature component weights to the test feature vector to determine a metric value; and
         designating the vertex of the plurality of vertices for removal based upon the metric value.

2. The computer system of claim 1, wherein the first plurality of training feature vectors, the second plurality of training feature vectors, and the test feature vector comprise:
   a first component color value;
   a second component color value;
   a third component color value;
   a squared value of the first component color value;
   a squared value of the second component color value;
   a squared value of the third component color value;
   a multiplied value of the first component color value and the third component color value;
   a multiplied value of the second component color value and the third component color value; and
   a multiplied value of the first component color value and the second component color value.

3. The computer system of claim 2, wherein the first component color value is a red value, the second component color value is a blue value, and the third component color value is a green value.

4. The computer system of claim 2, wherein the classifier is a support vector machine.

5. The computer system of claim 4, wherein
   the support vector machine is a linear support vector machine, and wherein
   applying the plurality of feature component weights to the test feature vector to determine a metric value comprises determining the dot product of the test feature vector with the plurality of feature component weights.

6. The computer system of claim 5, wherein the non-clothing object is a mannequin.

7. The computer system of claim 6, the method further comprising:
   applying a rule from at least one of a plurality of system rules or a plurality of artist rules to the vertex designated for removal, the rule assessing color values associated with a plurality of vertices neighboring the vertex designated for removal; and
   designating the vertex designated for removal to be retained based upon the application of the rule.

8. A non-transitory computer-readable medium comprising instructions configured to cause a computer system to perform a method comprising:
   receiving a first set of color values associated with asset data;
   receiving a second set of color values associated with non-asset data;
   generating a first plurality of training feature vectors from the first set of color values;
   generating a second plurality of training feature vectors from the second set of color values;
   determining a plurality of feature component weights by providing the first plurality of feature vectors and the second plurality of feature vectors to a classifier;
   receiving a virtual model comprising:
      a plurality of vertices, a first set of the plurality of vertices associated with asset data and a second set of the plurality of vertices associated with non-asset data; and
      a map associating each vertex from the plurality of vertices with a corresponding color value; and
   for a vertex of the plurality of vertices:
      determining a color value associated with the vertex in the map;
      generating a test feature vector based upon the color value;
      applying the plurality of feature component weights to the test feature vector to determine a metric value; and
      designating the vertex of the plurality of vertices for removal based upon the metric value.

9. The non-transitory computer-readable medium of claim 8, wherein the first plurality of training feature vectors, the second plurality of training feature vectors, and the test feature vector comprise:
   a first component color value;
   a second component color value;
   a third component color value;
   a squared value of the first component color value;
   a squared value of the second component color value;
   a squared value of the third component color value;
   a multiplied value of the first component color value and the third component color value;

a multiplied value of the second component color value and the third component color value; and a multiplied value of the first component color value and the second component color value.

10. The non-transitory computer-readable medium of claim 9, wherein the first component color value is a red value, the second component color value is a blue value, and the third component color value is a green value.

11. The non-transitory computer-readable medium of claim 9, wherein the classifier is a support vector machine.

12. The non-transitory computer-readable medium of claim 11, wherein
the support vector machine is a linear support vector machine, and wherein
applying the plurality of feature component weights to the test feature vector to determine a metric value comprises determining the dot product of the test feature vector with the plurality of feature component weights.

13. The non-transitory computer-readable medium of claim 12, wherein the asset is an article of clothing and the non-asset is a mannequin.

14. The non-transitory computer-readable medium of claim 13, the method further comprising:
applying a rule from at least one of a plurality of system rules or a plurality of artist rules to the vertex designated for removal, the rule assessing color values associated with a plurality of vertices neighboring the vertex designated for removal; and
designating the vertex designed for removal to be retained based upon the application of the rule.

15. A computer-implemented method for separating asset data from non-asset data in a scanned virtual model, the method comprising:
receiving a first set of color values associated with asset data;
receiving a second set of color values associated with non-asset data;
generating a first plurality of training feature vectors from the first set of color values;
generating a second plurality of training feature vectors from the second set of color values;
determining a plurality of feature component weights by providing the first plurality of feature vectors and the second plurality of feature vectors to a classifier;
receiving a virtual model comprising:
a plurality of vertices, a first set of the plurality of vertices associated with asset data and a second set of the plurality of vertices associated with non-asset data; and
a map associating each vertex from the plurality of vertices with a corresponding color value; and
for a vertex of the plurality of vertices:
determining a color value associated with the vertex in the map;
generating a test feature vector based upon the color value;
applying the plurality of feature component weights to the test feature vector to determine a metric value; and
designating the vertex of the plurality of vertices for removal based upon the metric value.

16. The computer-implemented method of claim 15, wherein the first plurality of training feature vectors, the second plurality of training feature vectors, and the test feature vector comprise:
a first component color value;
a second component color value;
a third component color value;
a squared value of the first component color value;
a squared value of the second component color value;
a squared value of the third component color value;
a multiplied value of the first component color value and the third component color value;
a multiplied value of the second component color value and the third component color value; and
a multiplied value of the first component color value and the second component color value.

17. The computer-implemented method of claim 16, wherein the first component color value is a red value, the second component color value is a blue value, and the third component color value is a green value.

18. The computer-implemented method of claim 16, wherein the classifier is a support vector machine.

19. The computer-implemented method of claim 18, wherein
the support vector machine is a linear support vector machine, and wherein
applying the plurality of feature component weights to the test feature vector to determine a metric value comprises determining the dot product of the test feature vector with the plurality of feature component weights.

20. The computer-implemented method of claim 19, wherein the asset is an article of clothing and the non-asset is a mannequin.

* * * * *